USO12172834B2

(12) United States Patent
Ueda et al.

(10) Patent No.: US 12,172,834 B2
(45) Date of Patent: Dec. 24, 2024

(54) ARTICLE STORAGE FACILITY

(71) Applicant: Daifuku Co., Ltd., Osaka (JP)

(72) Inventors: Yuichi Ueda, Hinocho (JP); Masashige Iwata, Hinocho (JP)

(73) Assignee: Daifuku Co., Ltd., Osaka (JP)

(*) Notice: Subject to any disclaimer, the term of this patent is extended or adjusted under 35 U.S.C. 154(b) by 328 days.

(21) Appl. No.: 17/912,241

(22) PCT Filed: Jan. 15, 2021

(86) PCT No.: PCT/JP2021/001235
§ 371 (c)(1),
(2) Date: Sep. 16, 2022

(87) PCT Pub. No.: WO2021/186868
PCT Pub. Date: Sep. 23, 2021

(65) Prior Publication Data
US 2023/0174301 A1 Jun. 8, 2023

(30) Foreign Application Priority Data
Mar. 17, 2020 (JP) .................................. 2020-046554

(51) Int. Cl.
*B65G 1/04* (2006.01)
*B65G 1/06* (2006.01)
*B65G 1/137* (2006.01)

(52) U.S. Cl.
CPC ......... *B65G 1/0492* (2013.01); *B65G 1/0435* (2013.01); *B65G 1/065* (2013.01); *B65G 1/137* (2013.01); *B65G 2203/0208* (2013.01)

(58) Field of Classification Search
CPC ...... B65G 1/137; B65G 1/065; B65G 1/0492; B65G 1/0435
See application file for complete search history.

(56) References Cited

U.S. PATENT DOCUMENTS

| 2015/0321845 A1* | 11/2015 | Nakamura | B65G 1/0421 414/273 |
| 2018/0134488 A1* | 5/2018 | Grosse | B65G 1/0435 |
| 2018/0339858 A1* | 11/2018 | Iwata | B65G 1/0435 |
| 2018/0370729 A1* | 12/2018 | Ueda | B65G 1/065 |

(Continued)

FOREIGN PATENT DOCUMENTS

JP 5541178 B 5/2014

*Primary Examiner* — Kaitlin S Joerger
(74) *Attorney, Agent, or Firm* — The Webb Law Firm

(57) ABSTRACT

A control unit controls a transfer machine to execute: a first article delivery operation to store a target article in a first placement region as a first article; and a second article position adjustment operation of moving a second locking member disposed between the first article and a second article in a depth direction toward a depth-direction far side to a position corresponding to a position of a front surface portion of the second article located at a second article proper position, and the control unit is configured to, after the target article has been stored in the first placement region as the first article, cause the transfer machine to execute the second article position adjustment operation, and, upon end of the second article position adjustment operation, cause a first locking member be restored to a position corresponding to a holding region to end the first article delivery operation.

6 Claims, 11 Drawing Sheets

(56) References Cited

U.S. PATENT DOCUMENTS

| | | | |
|---|---|---|---|
| 2020/0172334 A1* | 6/2020 | Yamashita | B65G 1/065 |
| 2023/0002168 A1* | 1/2023 | Turco | B65G 1/065 |
| 2023/0047293 A1* | 2/2023 | Ueda | B65G 1/0435 |
| 2023/0271779 A1* | 8/2023 | Siraisi | B65G 1/0485 |
| | | | 700/218 |
| 2023/0348186 A1* | 11/2023 | Siraisi | B65G 1/065 |
| 2024/0034556 A1* | 2/2024 | Kiyokawa | B65G 1/0421 |
| 2024/0051745 A1* | 2/2024 | Tatemi | B65G 1/0421 |

* cited by examiner

Fig.11
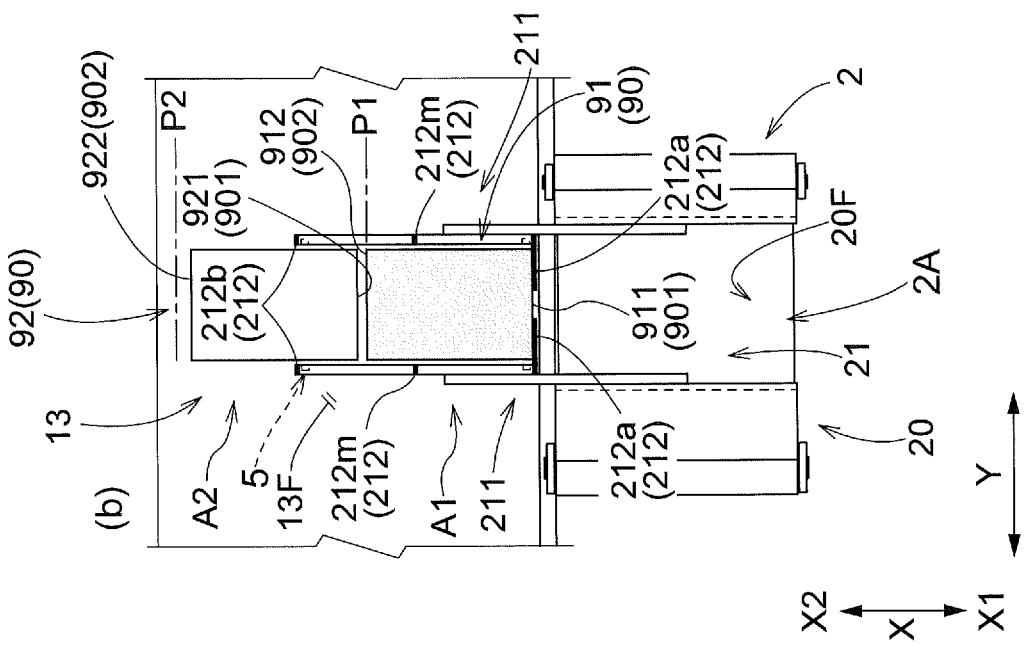
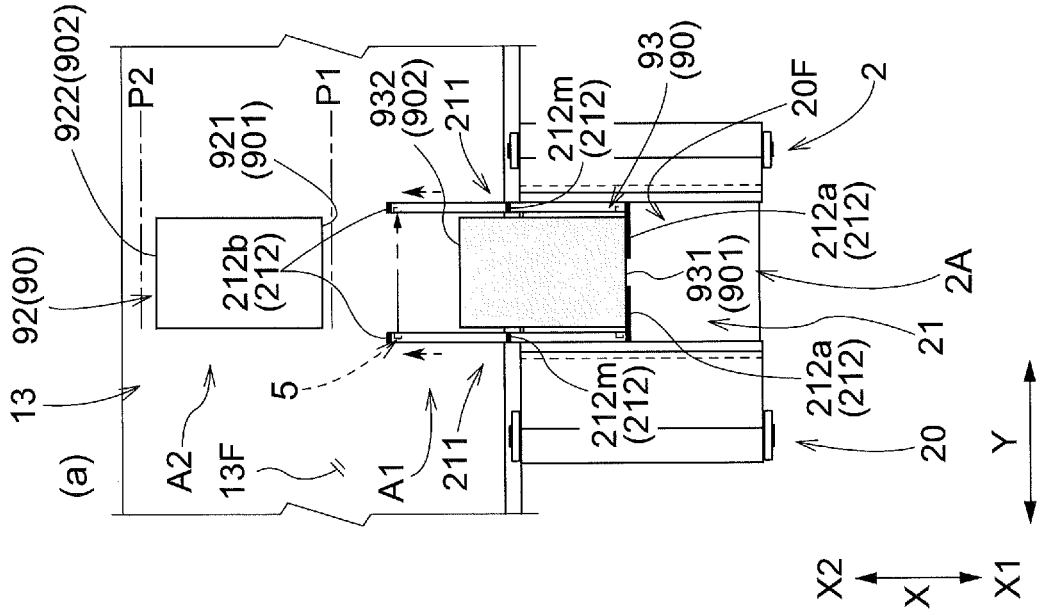

ARTICLE STORAGE FACILITY

CROSS-REFERENCE TO RELATED APPLICATION

This application is the United States national phase of International Application No. PCT/JP2021/001235, filed Jan. 15, 2021, and claims priority to Japanese Patent Application No. 2020-046554 filed Mar. 17, 2020 the disclosures of which are hereby incorporated by reference in their entirety.

BACKGROUND OF THE INVENTION

Field of the Invention

The present invention relates to an article storage facility including an article storage rack including a storage section capable of storing articles, and a transport device that transports the articles.

Description of Related Art

An example of such an article storage facility is disclosed in Japanese Patent No. 5541178 (Patent Document 1). In the following, the reference numerals shown in parentheses in the description of the background art are those of Patent Document 1.

The article storage facility described in Patent Document 1 includes a storage section (11) capable of storing two articles (W) arranged in a depth direction (X), and a transport device (3) that transports the articles (W) in a transport direction (Y) intersecting the depth direction (X). The transport device (3) includes a transfer machine (29) that moves the articles (W) in the depth direction (X), and the transfer machine (29) transfers the articles (W) to the storage section (11).

PATENT DOCUMENTS

Patent Document 1: Japanese Patent No. 5541178

Meanwhile, in the article storage facility described in Patent Document 1, an article (W) stored in the storage section (11) may become displaced due to vibrations caused by the operation or the like of the transport device (3). The position of the displaced article (W) can be adjusted using the transfer machine (29) included in the transport device (3).

In such a facility, when a region on a side (far side) distant from the transport device (3) and a region on a side closer (near side) to the transport device (3) of the storage section (11) in the depth direction (X) are both empty without an article (W) being stored therein, an article (W) is, in general, preferentially stored in the region on the far side. Accordingly, an article (W) stored in the region on the far side of the storage section (11) is often stored for longer than an article (W) stored in the region on the near side of the storage section (11), and the amount of displacement of the article (W) on the far side is likely to increase accordingly. When the amount of displacement is large, it is difficult to appropriately transfer the article (W) using the transfer machine (29). For this reason, it is conceivable to periodically detect displacement of an article (W) stored in the region on the far side of the storage section (11), and adjust the position of the article (W) to correct displacement, if any, using the transfer machine (29). However, if the storage and retrieval operation of the article (W) to and from the storage section (11) is impeded by the position adjustment of the article (W), the overall storage and retrieval capability of the facility will be reduced. Preferential execution of the storage and retrieval operation of the facility to avoid this situation may lead to fewer opportunities to adjust the positions of the articles (W). Thus, the position adjustment cannot be executed at an appropriate timing, resulting in a possible increase in the displacement of articles (W) stored in the storage section (11). As such, with the conventional technique, it is not possible to efficiently adjust the position of the article on the far side.

SUMMARY OF THE INVENTION

In view of the above-described circumstances, it is desirable to realize an article storage facility that enables, in a configuration including a storage section capable of storing two articles arranged in a depth direction, efficient adjustment of the position of the article disposed on the far side in the depth direction.

An article storage facility according to the present disclosure includes:
  an article storage rack including a storage section capable of storing two articles arranged in a depth direction;
  a transport device configured to transport the articles in a transport direction intersecting the depth direction; and
  a control unit configured to control operation of the transport device,
  wherein the transport device includes a transfer machine configured to execute a delivery operation of moving the articles in the depth direction to deliver the articles to the article storage rack,
  when a side on which the transport device is located relative to the article storage rack in the depth direction is defined as a depth-direction near side, a side opposite to the depth-direction near side is defined as a depth-direction far side, the article stored in a first placement region on the depth-direction near side of the storage section is defined as a first article, the article stored in a second placement region on the depth-direction far side of the storage section is defined as a second article, the article that is being transported by the transport device is defined as a target article, a proper position of the second article in the storage section is defined as a second article proper position, and a region in the transport device in which region the target article is held is defined as a holding region,
  the transfer machine includes a locking part configured to be locked to a front surface portion of each of the articles which front surface portion faces the depth-direction near side, and a driver configured to move the locking part between a position corresponding to the holding region and a position corresponding to the first placement region or the second placement region,
  the locking part includes a first locking member and a second locking member,
  the control unit is capable of controlling the driver to cause the transfer machine to execute:
  a first article delivery operation of disposing the first locking member on the depth-direction near side relative to the front surface portion of the target article located in the holding region, and subsequently moving the first locking member to the depth-direction far side with the first locking member locked to the front surface portion of the target article, to store the target article in the first placement region as the first article, and subsequently moving the first locking member to the depth-direction near side so as to be restored to the position corresponding to the holding region, to execute the delivery operation; and, a second article position adjustment operation of moving the second locking member disposed between the first article and the second article in the depth direction toward the depth-direction far side to a position corresponding to a position of the front surface portion of the second article located at the second article proper position, and the control unit is configured to, after the target article has been stored in the first placement region as the first article during execution of the first article delivery operation using the transfer machine, cause the transfer machine to execute the second article position adjustment operation, and, upon end of the second article position adjustment operation, cause the first locking member to be restored to the position corresponding to the holding region to end the first article delivery operation.

With the present configuration, the transfer machine executes the second article position adjustment operation to move the second locking member toward the depth-direction far side to a position corresponding to a position of the front surface portion of the second article located at the second article proper position. Thus, even if the second article has shifted from the second article proper position toward the depth-direction near side before the second article position adjustment operation is executed, the second article can be moved to the depth-direction far side to be positioned at the second article proper position using the second locking member. Also, with the present configuration, such a second article position adjustment operation is executed after the target article has been stored in the first placement region as the first article during execution of the first article delivery operation. That is, using the operation of moving the first locking member to the depth-direction far side in order to store the target article in the first placement region as the first article, it is possible to dispose the second locking member between the first article and the second article in the depth direction, and execute the second article position adjustment operation. Therefore, with the present configuration, it is possible to efficiently adjust the position of the second article stored on the depth-direction far side of the storage section.

Further features and advantages of the technique according to the present disclosure will become apparent from the following description of illustrative and non-limiting embodiments with reference to the drawings.

BRIEF DESCRIPTION OF THE DRAWINGS

FIG. 11 is a diagram illustrating a second article position detection operation.

DESCRIPTION OF THE INVENTION

Best Mode for Carrying Out the Invention

An article storage facility according to an embodiment will be described below with reference to the drawings.

Schematic Configuration of Article Storage Facility

Figure 1:
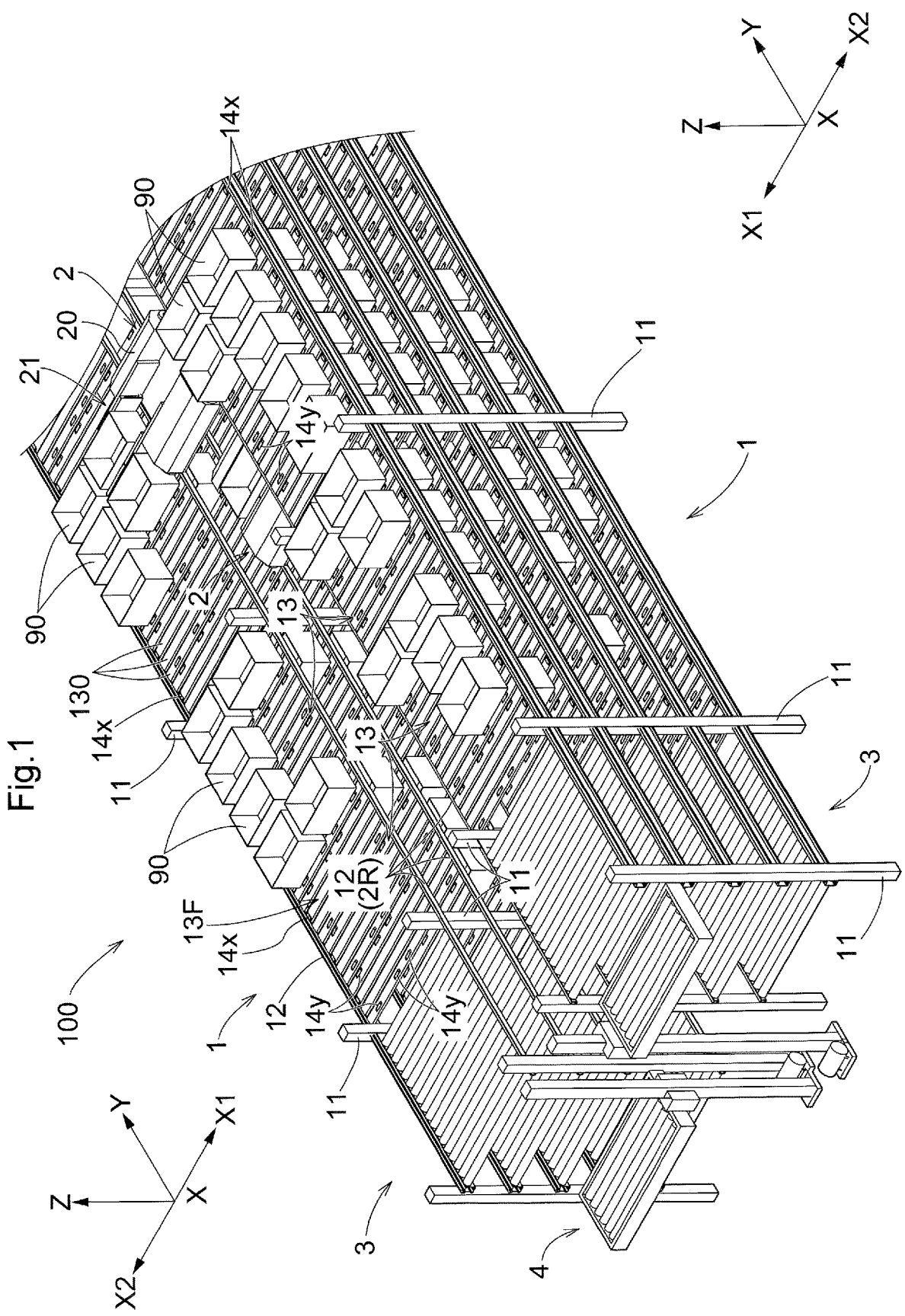
FIG. 1 is a schematic perspective view of an article storage facility.

As shown in FIG. 1, an article storage facility 100 includes at least one article storage rack 1 including at least one storage section 13 capable of storing two articles 90 arranged in a depth direction X, at least one transport device 2 that transports the articles 90 in a transport direction intersecting the depth direction X, and a control unit C2 (see FIG. 6) that controls operation of the transport device 2. In the present embodiment, a pair of article storage racks 1 are disposed on opposite sides in the depth direction X with the transport device 2 therebetween.

The transport device 2 includes a transfer machine 21 that executes a delivery (storage) operation of moving the articles 90 in the depth direction X to deliver (store) the articles 90 to an article storage rack 1 (storage section 13). In the present embodiment, the transfer machine 21 is configured to execute, in addition to such a delivery operation, a take-out operation of taking out the articles 90 from each article storage rack 1 (storage section 13). That is, the transfer machine 21 is configured to execute a transfer operation of transferring the articles 90 to a storage section 13 of an article storage rack 1, the transfer operation including the delivery operation and the take-out operation described above.

Here, the "depth direction X" is a direction in which the transport device 2 places the articles 90 into, or takes the articles 90 out of each article storage rack 1 (storage section 13). That is, the depth direction X coincides with the direction in which the articles 90 are transferred to/from the storage section 13 by the transfer machine 21. In the following, a side in the depth direction X on which the transport device 2 is located relative to the article storage rack 1 is referred to as a depth-direction near side X1, and a side opposite thereto is referred to as a depth-direction far side X2. A direction that is orthogonal to the depth direction X in a plan view is referred to as a "width direction Y". The width direction Y coincides with the direction in which the articles 90 are transported by the transport device 2. In the present example, the width direction Y also coincides with a direction in which a front plane (virtual plane in which an opening for transferring the articles 90 is provided) of each article storage rack 1 horizontally extends. Note that the two article storage racks 1 have the same structure, and the following description regarding the article storage rack 1 is given for one of the two article storage racks 1 unless otherwise stated.

In the present embodiment, the article storage rack 1 includes at least one storage section 13 in which the articles 90 are stored, a plurality of struts 11 disposed at predetermined intervals in the depth direction X and the width direction Y, and a beam 12 provided between each pair of struts 11 that are adjacent to each other in the width direction Y.

Figure 2:
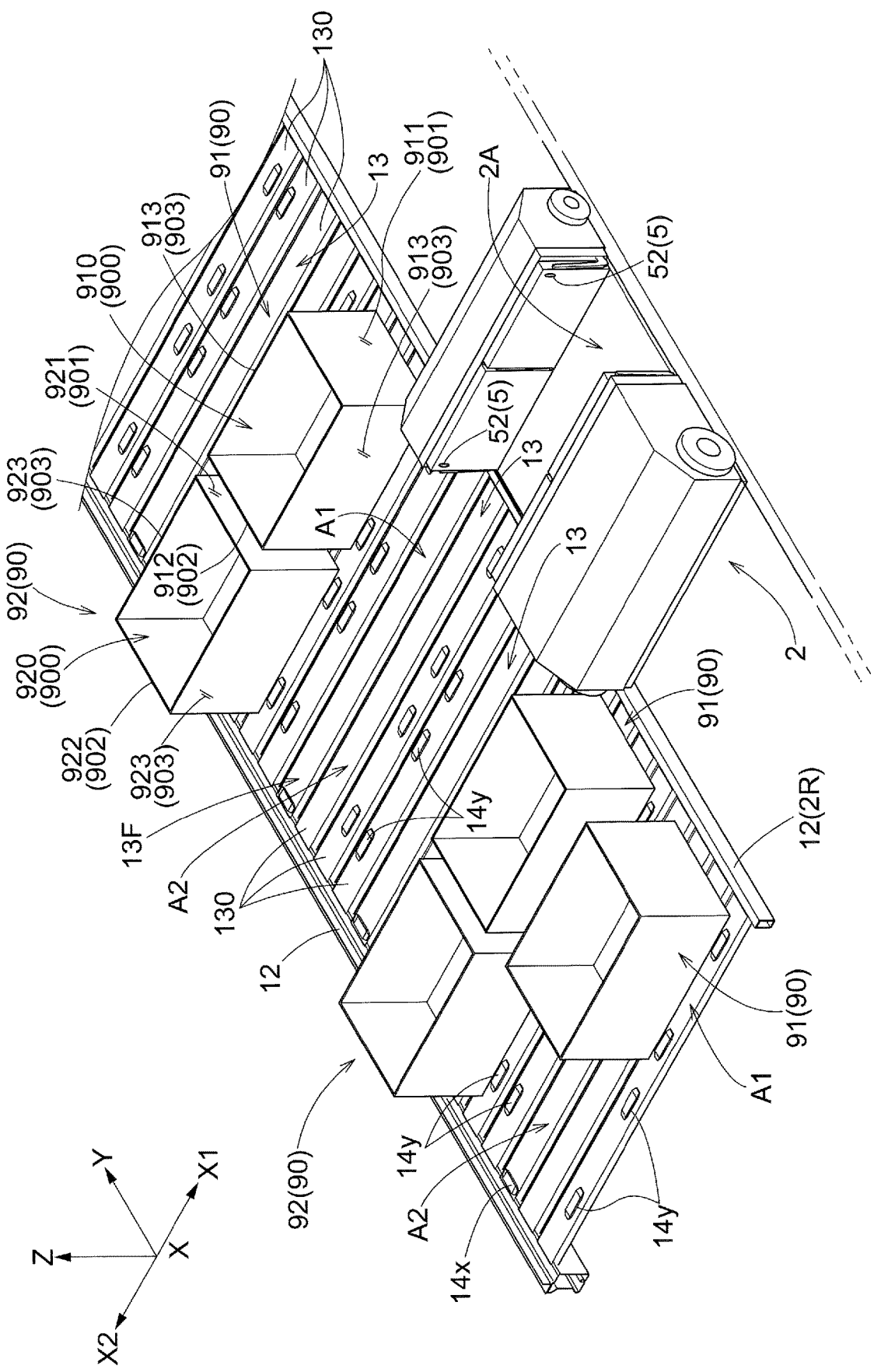
FIG. 2 is a perspective view showing relevant parts of an article storage rack.

As shown in FIG. 2, in the present embodiment, the surface of each storage section 13 on which the articles 90 are placed is referred to as a placement surface 13F. Each storage section 13 includes at least one shelf plate member 130 on which the placement surface 13F is formed. The shelf plate member 130 is a plate-shaped member that is bent at a plurality of positions. Also, the placement surface 13F is formed on an upper surface of the shelf plate member 130. In the present embodiment, one storage section 13 is formed by a plurality of shelf plate members 130 arranged in the width direction Y. In the present example, one storage section 13 is formed by four shelf plate members 130 arranged in the width direction Y.

In the present embodiment, a plurality of storage sections 13 are arranged in the width direction Y between each pair of struts 11 that are adjacent to each other in the width direction Y. Each storage section 13 is configured to store two articles 90 arranged in the depth direction X. That is, each storage section 13 has a placement surface 13F that is longer in the depth direction X than the total length of the two articles 90 in the depth direction X, and that is longer the width direction Y than the length of one article 90 in the width direction Y. In the present embodiment, a plurality of sets of storage sections 13 arranged in the width direction Y are provided in a plurality of rows in the vertical direction Z. Additionally, in the present embodiment, a plurality of rows of transport devices 2 are provided in one-to-one correspondence with the plurality of rows of storage sections 13.

As shown in FIG. 1, the article storage facility 100 includes at least one lifter 4 capable of moving up and down in the vertical direction Z to transport the articles 90 to a height corresponding to each of the plurality of rows of storage sections 13. For example, the lifter 4 includes a mast extending in the vertical direction Z, and an article placement table that is driven by a motor to move up and down along the mast.

A relay conveyor 3 that transports the articles 90 between the lifter 4 and the article storage rack 1 is provided between the lifter 4 and the article storage rack 1 in the width direction Y. A plurality of rows of relay conveyors 3 are provided in one-to-one correspondence with the plurality of rows of storage sections 13, and transport the articles 90 in the width direction Y with the articles 90 placed thereon. For example, each relay conveyor 3 is constituted by a roller conveyor, a belt conveyor, or the like. In the illustrated examples, a pair of sets of an article storage rack 1, a relay conveyor 3, and a lifter 4 arranged in the width direction Y are provided in the depth direction X with transport devices 2 therebetween. However, the present disclosure is not limited to such a configuration, and a set of an article storage rack 1, a relay conveyor 3, and a lifter 4 may be provided on only one side in the depth direction X relative to a transport path of each transport device 2.

In the article storage facility 100 according to the present embodiment, storage and retrieval of the articles 90 are executed using the lifter 4, the relay conveyor 3, and the transport device 2. However, transport devices such as the lifter 4 and the relay conveyor 3 are not essential components of the article storage facility 100. Conversely, storage and retrieval of the articles 90 may be executed using another transport device (or a person) in addition to the lifter 4 and the relay conveyor 3.

Articles

Here, a description will be given of an article 90 that is an object to be transported by the transport device 2 (an object to be transferred by the transfer machine 21), and that is also an object to be stored in the storage section 13. In the following description of the article 90, when any "direction" or any "side" is defined, they are defined with reference to a state in which the article 90 is stored in the storage section 13.

In the present embodiment, the article 90 is a case that houses a product or the like. More specifically, the article 90 is a resin case (e.g., a container or a so-called collapsible container that can be folded).

Figure 4:
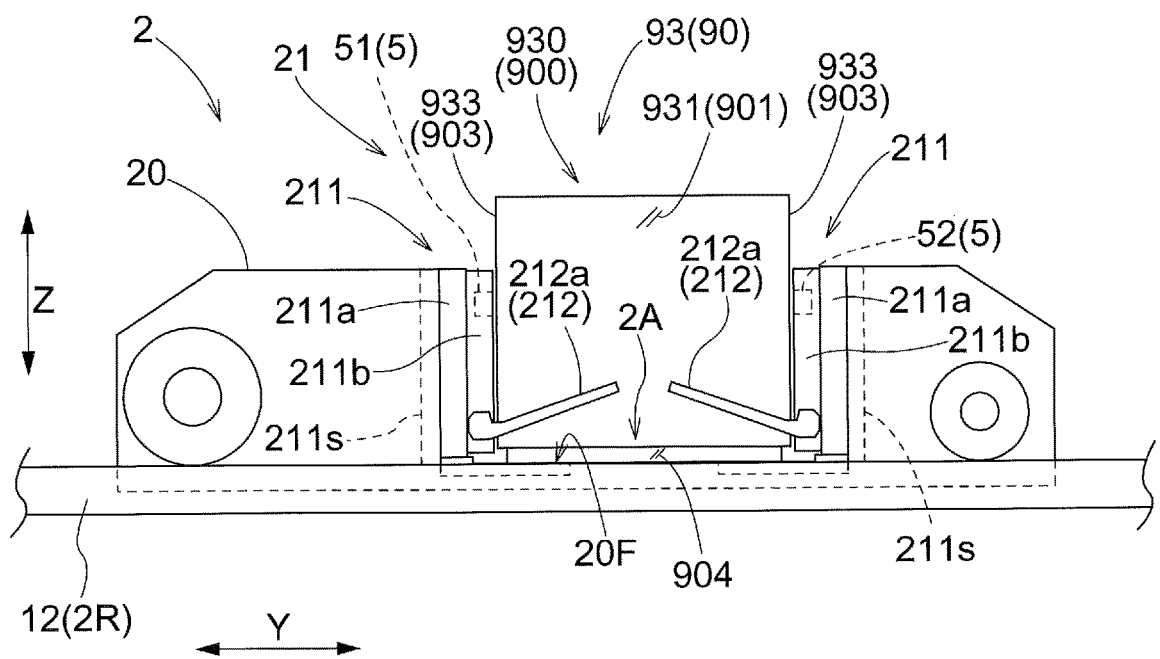
FIG. 4 is a diagram showing relevant parts of the transport device as viewed in a depth direction.

As shown in FIG. 2, in the present embodiment, the article 90 includes a main body portion 900, and a bottom portion 904 protruding downward from the main body portion 900 (see FIG. 4). In the present embodiment, the main body portion 900 is a portion that houses a product or the like, and has a box shape. Also, the main body portion 900 has, while an article 90 is stored in the storage section 13, a front surface portion 901 formed on a front surface which front surface portion faces the depth-direction near side X1, a rear surface portion 902 formed on a rear surface which rear surface portion faces the depth-direction far side X2, and side surface portions 903 respectively formed on opposite sides facing the width direction Y. The pair of side surface portions 903 face opposite sides in the width direction Y. The front surface portion 901 and the rear surface portion 902 have the same structure, and both can be the front surface portion 901 or the rear surface portion 902, depending on the state in which the article 90 is housed.

The bottom portion 904 is a portion that is placed on the placement surface 13F of the storage section 13 while the article 90 is stored in the storage section 13. As shown in FIG. 4, the bottom portion 904 is supported from below by the transport device 2 (more specifically, a support surface 20F of a travel carriage 20) when the article 90 is transported by the transport device 2. In the present example, the article 90 is transferred between the transport device 2 and the storage section 13 as a result of the bottom portion 904 sliding over the support surface 20F of the travel carriage 20 and the placement surface 13F of the storage section 13. In the present embodiment, the bottom portion 904 is smaller than the main body portion 900 in a plan view.

As described above, each storage section 13 that stores articles 90 is configured to store two articles 90 arranged in the depth direction X. Here, as shown in FIG. 2, an article 90 stored in a first placement region A1 on the depth-direction near side X1 of the storage section 13 is referred to as a first article 91, and an article 90 stored in a second placement region A2 on the depth-direction far side X2 of the storage section 13 is referred to as a second article 92. Also, while an article 90 is stored in a storage section 13, the article 90 is referred to as a first article 91 or a second article 92 according to the storage region thereof. When an article 90 is being transferred by a transport device 2, the article 90 is referred to as a target article 93. Also, the target article 93 is transported in the width direction Y while being held by the transport device 2, and is moved and transferred in the depth direction X by the transfer machine 21. A holding region 2A for holding the target article 93 being transported in the width direction Y is set in the transport device 2. Accordingly, while the target article 93 is being transported in the width direction Y (also while the transport device 2 is stopped), the target article 93 is held by the transport device 2 in the holding region 2A set in the transport device 2.

In the following, the main body portion, the front surface portion, the rear surface portion, and the side surface portions of the first article 91 are respectively denoted by 910, 911, 912, and 913 in the drawings. Similarly, the main body portion, the front surface portion, the rear surface portion, and the side surface portions of the second article 92 are respectively denoted by 920, 921, 922, and 923 in the drawings. Also, the main body portion, the front surface portion, the rear surface portion, and the side surface portions of the target article 93 are respectively denoted by 930, 931, 932, and 933 in the drawings. When there is no need to distinguish between the first article 91, the second article 92, and the target article 93, these articles are simply referred to as an article 90.

Configuration of Article Storage Rack

As shown in FIGS. 1 and 2, the article storage rack 1 includes at least one storage section 13 that has a placement surface 13F on which the articles 90 are placed, and that stores the articles 90 that are transferred so as to slide on the placement surface 13F in the depth direction X.

Each storage section 13 is configured to store two articles 90 arranged in the depth direction X. As described above, in the present embodiment, the storage section 13 includes a plurality of shelf plate members 130 arranged in the width direction Y. The placement surface 13F of the storage section 13 is formed by the respective upper surfaces of the plurality of shelf plate members 130 of the storage section 13. As described above, the first placement region A1 and the second placement region A2 in which the articles 90 are placed are set in the storage section 13. The first placement region A1 is set in a region on the depth-direction near side X1 of the storage section 13, and the second placement region A2 is set in a region that is further toward the depth-direction far side X2 than the first placement region A1, and that is on the depth-direction far side X2 of the storage section 13. The first placement region A1 and the second placement region A2 are each set as a partial region of the placement surface 13F.

Figure 7:
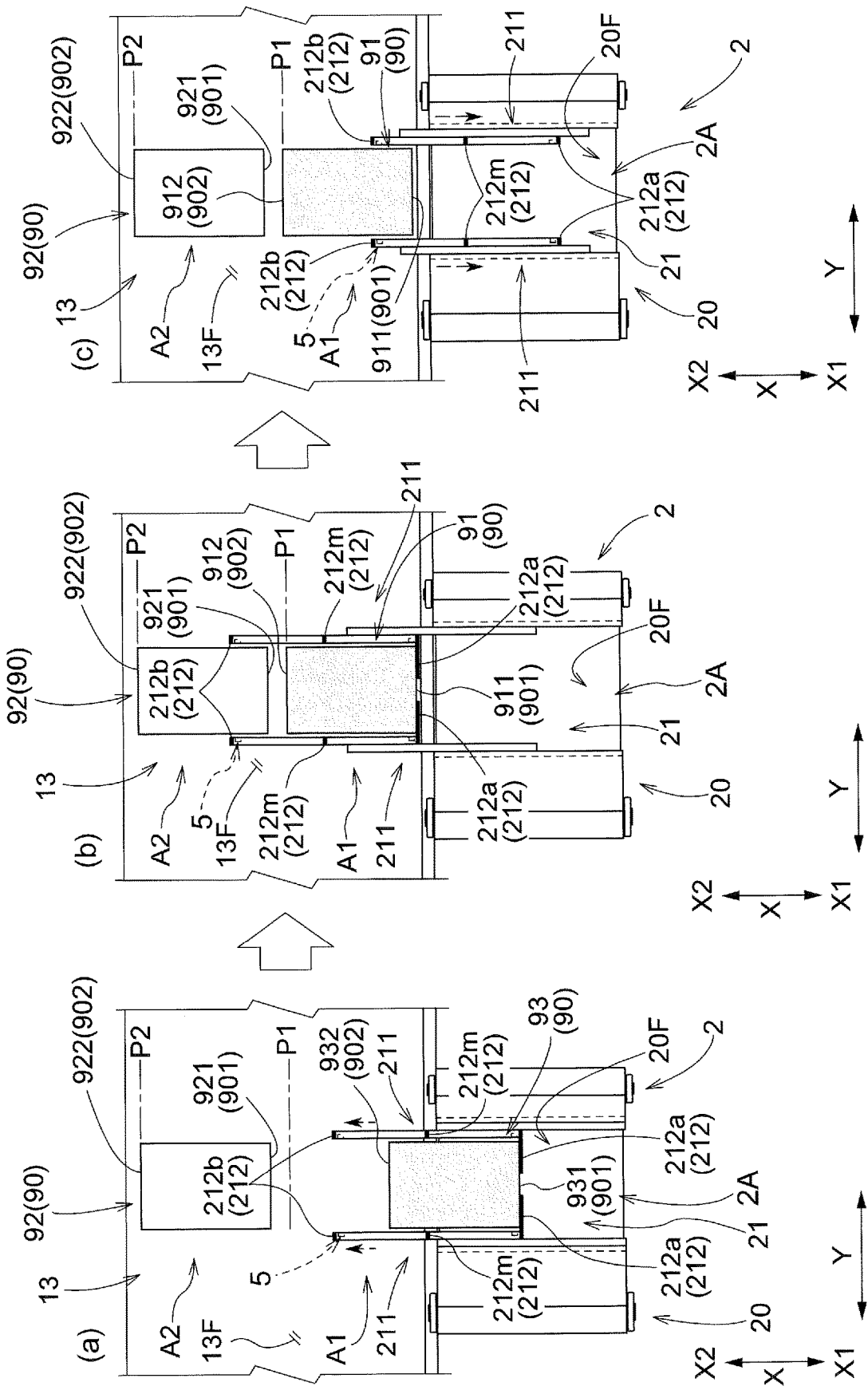
FIG. 7 is a diagram illustrating a first article delivery operation.

In the present embodiment, as shown in the diagrams illustrating operations in FIG. 7 and so forth, a proper position of the first article 91 in the storage section 13 is defined as a first article proper position P1, and a proper position of the second article 92 in the storage section 13 is defined as a second article proper position P2.

As shown in FIG. 2, in the present embodiment, width direction restricting members 14y protruding upward from the placement surface 13F are provided on opposite sides in the width direction Y relative to each of the first placement region A1 and the second placement region A2. Accordingly, it is possible to restrict the position in the width direction Y of an article 90 stored in the storage section 13.

In the present embodiment, when an article 90 is stored in a storage section 13, the width direction restricting members 14y are disposed on opposite sides in the width direction Y relative to the article 90. In the present example, the width direction restricting members 14y are disposed on opposite sides in the width direction Y relative to the first placement region A1. In the illustrated example, a pair of width direction restricting members 14y are disposed spaced apart in the depth direction X on each of the opposite sides in the width direction Y relative to the first placement region A1. That is, four width direction restricting members 14y are disposed for one first placement region A1. Accordingly, it is possible to restrict rotation of the first article 91 about an axis that is orthogonal to the placement surface 13F, and thus the orientation of the first article 91 can be easily restricted to a proper orientation. In other words, the orientation of the first article 91 can be restricted such that the side surface portions 913 of the first article 91 extend in the depth direction X, and the front surface portion 911 and the rear surface portion 912 of the first article 91 extend in the width direction Y. Accordingly, it is possible to realize a configuration that facilitates the transfer of the first article 91 in an appropriate orientation. In the present example, in order to enhance such a restricting function, each of the width direction restricting members 14y is disposed at a position that is outside the first placement region A1 and that is adjacent to a boundary in the width direction Y of the first placement region A1. The width direction restricting members 14y are also disposed for the second placement region A2 in the same manner as in the case of the first placement region A1. That is, in the present example, four width direction restricting members 14y are disposed for one second placement region A2. Accordingly, it is possible to realize a configuration that facilitates the transfer of the second article 92 in an appropriate orientation.

In the present embodiment, a depth direction restricting member 14x protruding upward from the placement surface 13F is provided on the depth-direction far side X2 relative to the second placement region A2. Accordingly, it is possible to restrict movement of the second article 92 stored in the storage section 13 further toward the depth-direction far side X2 past the depth direction restricting member 14x.

In the present embodiment, the depth direction restricting member 14x is disposed on the depth-direction far side X2 relative to the second article 92 placed on the second placement region A2. In the present example, the depth direction restricting member 14x is disposed on the depth-direction far side X2 relative to the second placement region A2. More specifically, the depth direction restricting member 14x is disposed at a position that is outside the second placement region A2, and that is adjacent to a boundary in the depth-direction far side X2 of the second placement region A2. In the present example, one depth direction restricting member 14x is disposed on the depth-direction far side X2 relative to the second placement region A2. However, the present disclosure is not limited thereto, and a plurality of depth direction restricting members 14x may be disposed on the depth-direction far side X2 relative to the second placement region A2.

In the present embodiment, the width direction restricting members 14y and the depth direction restricting member 14x are each formed by a member separate from the corresponding shelf plate member 130, and are arranged in the storage section 13 by being attached to the shelf plate member 130. However, the present disclosure is not limited thereto, and at least either the width direction restricting members 14y or the depth direction restricting member 14x may be formed in one piece with the corresponding shelf plate member 130.

Here, the above-described first article proper position P1 (see FIG. 7, etc.) is a proper position of the first article 91 in the storage section 13. In the present embodiment, the first article proper position P1, in the width direction Y, is a position of the first article 91 stored in the storage section 13 while a position thereof in the width direction Y is restricted by the width direction restricting members 14y, and the first article proper position P is defined with reference to the position in the width direction Y of the side surface portions 913 of the first article 91. The first article proper position P1, in the depth direction X, is a position of the first article 91 stored in the storage section 13 such that the front surface portion 911 of the first article 91 is located at a position away from an end portion on the depth-direction near side X1 of the storage section 13 toward the depth-direction far side X2 by a predetermined distance, and is defined with reference to the position in the depth direction X of the front surface portion 911 or the rear surface portion 912 of the first article 91. In the present example, as shown in FIG. 7 and so forth, the first article proper position P1 in the depth direction X is defined with reference to the rear surface portion 912 of the first article 91. That is, with the rear surface portion 912 of the first article 91 located at the first article proper position P1 indicated by the dash-dot line in the drawings, the first article 91 is located at the first article proper position P1 in the depth direction X.

The above-described second article proper position P2 (see FIG. 7, etc.) is a proper position of the second article 92 in the storage section 13. In the present embodiment, the second article proper position P2, in the width direction Y, is a position of the second article 92 stored in the storage section 13 while a position thereof in the width direction Y is restricted by the width direction restricting members 14y, and the second article proper position P2 is defined with reference to the position in the width direction Y of the side surface portions 923 of the second article 92. The second article proper position P2, in the depth direction X, is a position of the second article 92 stored in the storage section 13 such that the rear surface portion 922 of the second article 92 is located at a position away from an end portion on the depth-direction far side X2 of the storage section 13 toward the depth-direction near side X1 by a predetermined distance, and is defined with reference to the position in the depth direction X of the front surface portion 921 or the rear surface portion 922 of the second article 92.

In the present example, as shown in FIG. 7 and so forth, the second article proper position P2 in the depth direction X is defined with reference to the rear surface portion 922 of the second article 92. That is, with the rear surface portion 922 of the second article 92 located at the second article proper position P2 indicated by the dashed dotted line in the drawings, the second article 92 is located at the second article proper position P2 in the depth direction X. Although not shown in detail in FIG. 7 and so forth, in the present example, the rear surface portion 922 of the second article 92 located at the second article proper position P2 is disposed further toward the depth-direction near side X1 than the depth direction restricting member 14x is (see FIG. 2).

Configuration of Transport Device

As shown in FIG. 1, each transport device 2 transports articles 90 in the width direction Y. The transport device 2 moves an article 90 in the depth direction X to transfer the article 90 to a storage section 13. In other words, the transport device 2 transports the target article 93 in the width direction Y, and moves the target article 93 in the depth direction X to transfer the target article 93 to a storage section 13.

In the present embodiment, each transport device 2 includes travel rails 2R disposed extending in the width direction Y, and a travel carriage 20 that is supported by the travel rails 2R and that travels along the travel rails 2R. Each of the travel rails 2R is provided on the depth-direction near side X1 relative to the plurality of storage sections 13 arranged in the width direction Y. In the present embodiment, each of the travel rails 2R is provided in one piece with the beams 12 located on the depth-direction near side X1 of the corresponding article storage rack 1. The travel carriage 20 includes a support surface 20F (see FIGS. 3 and 4) capable of supporting an article 90 from below. The transport device 2 is configured to transport an article 90 in the width direction Y using the travel carriage 20 traveling on the travel rails 2R with the article 90 supported by the support surface 20F. In the present embodiment, the above-described holding region 2A is set on the support surface 20F of the travel carriage 20.

Each transport device 2 includes a transfer machine 21 configured to execute a transfer operation of transferring an article 90 to/from each storage section 13 of the article storage rack 1. The transfer machine 21 is configured to transfer an article 90 to/from the storage section 13 by moving the article 90 in the depth direction X. More specifically, as shown in FIG. 7 and so forth, the transport device 2 is configured to transfer an article 90 to/from each storage section 13 by causing the article 90 to slide in the depth direction X on the support surface 20F of the travel carriage 20 and the placement surface 13F of a storage section 13.

In other words, the transport device 2 is configured to transfer an article 90 between the holding region 2A and the first placement region A1 or the second placement region A2 by moving the article 90 in the depth direction X.

Figure 3:
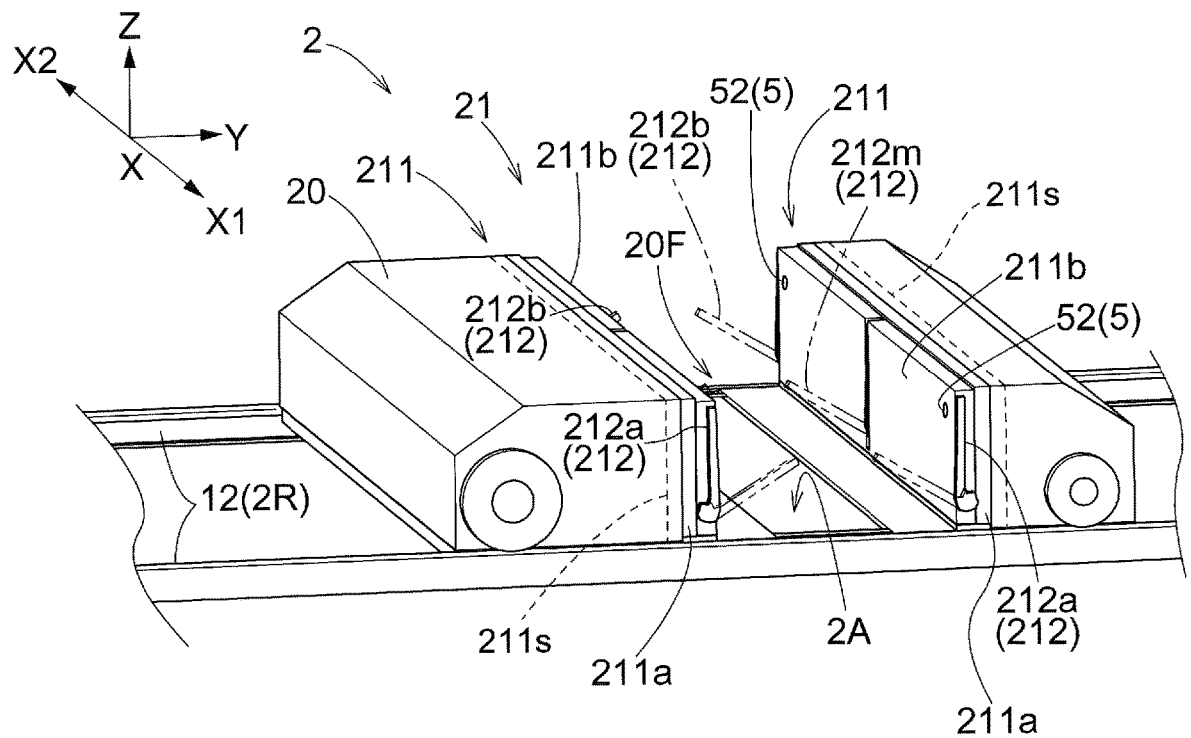
FIG. 3 is a perspective view showing relevant parts of a transport device.

As shown in FIGS. 3 and 4, the transfer machine 21 includes at least one locking part 212 configured to be locked to either the front surface portion 901 of an article 90 which front surface portion faces the depth-direction near side X1 or the rear surface portion 902 (see FIG. 2) of the article 90 which rear surface portion faces the depth-direction far side X2. As shown in FIG. 7 and so forth, the transfer machine 21 includes a driver M (see FIG. 6) configured to move the locking part 212 between a position corresponding to the holding region 2A and a position corresponding to the first placement region A1 or the second placement region A2. The transfer machine 21 is configured to transfer an article 90 to each storage section 13 by moving the article 90 in the depth direction X with the locking part 212 locked to the front surface portion 901 or the rear surface portion 902 of the article 90. In the present example, the position corresponding to the holding region 2A is a position that overlaps the holding region 2A in a plan view. The position corresponding to the first placement region A1 is a position that overlaps the first placement region A1 in a plan view. The position corresponding to the second placement region A2 is a position that overlaps the second placement region A2 in a plan view. As described above, the transfer operation executed by the transfer machine 21 includes the delivery operation of delivering the articles 90 to each storage section 13, and the take-out operation of taking out the articles 90 from each storage section 13.

In the present embodiment, the transfer machine 21 includes at least one transfer arm 211 configured to extend and retract in the depth direction X. Here, the transfer machine 21 includes a pair of transfer arms 211 disposed spaced apart from each other in the width direction Y. The pair of transfer arms 211 are configured to extend and retract on opposite sides in the width direction Y relative to an article 90 to be transferred. That is, one of the two transfer arms 211 extends and retracts on the outer side in the width direction Y relative to one side surface portion 903 (see FIG. 2) of an article 90, and the other of the two transfer arms 211 extends and retracts on the outer side in the width direction Y relative to the other side surface portion 903 of the article 90. Each transfer arm 211 is driven to extend and retract in the depth direction X by an extension/retraction motor M1 (see FIG. 6).

In the present embodiment, each transfer arm 211 includes a supporting portion 211s that is fixed to the travel carriage 20, a first arm 211a supported so as to be movable in the depth direction X relative to the supporting portion 211s, and a second arm 211b supported so as to be movable in the depth direction X relative to the first arm 211a. Also, the first arm 211a moves in the depth direction X relative to the supporting portion 211s, and the first arm 211a and the second arm 211b move in the depth direction X relative to each other, whereby the transfer arm 211 stretches and contracts in the depth direction X. With such a configuration, the transfer arm 211 can extend and retract in the depth direction X to move an article 90 in the depth direction X.

The locking part 212 that is locked to the article 90 as a result of the transfer operation is provided on each transfer arm 211. In the present example, the locking part 212 is provided on the second arm 211b of the transfer arm 211, and is configured to move in the depth direction X as the second arm 211b moves in the depth direction X. The locking part 212 is supported by the transfer arm 211 so as to be turnable about an axis extending in the depth direction X, and is configured to change, through the above-described turning, between a protruding state of protruding from the transfer arm 211 toward the other transfer arm 211 in the width direction Y, and a non-protruding state of not protruding toward the other transfer arm 211 in the width direction Y. The locking part 212 is disposed at a position that overlaps an article 90 to be transferred as viewed in the depth direction X in the protruding state, and is disposed at a position that does not overlap an article 90 to be transferred as viewed in the depth direction X in the non-protruding state.

Figure 6:
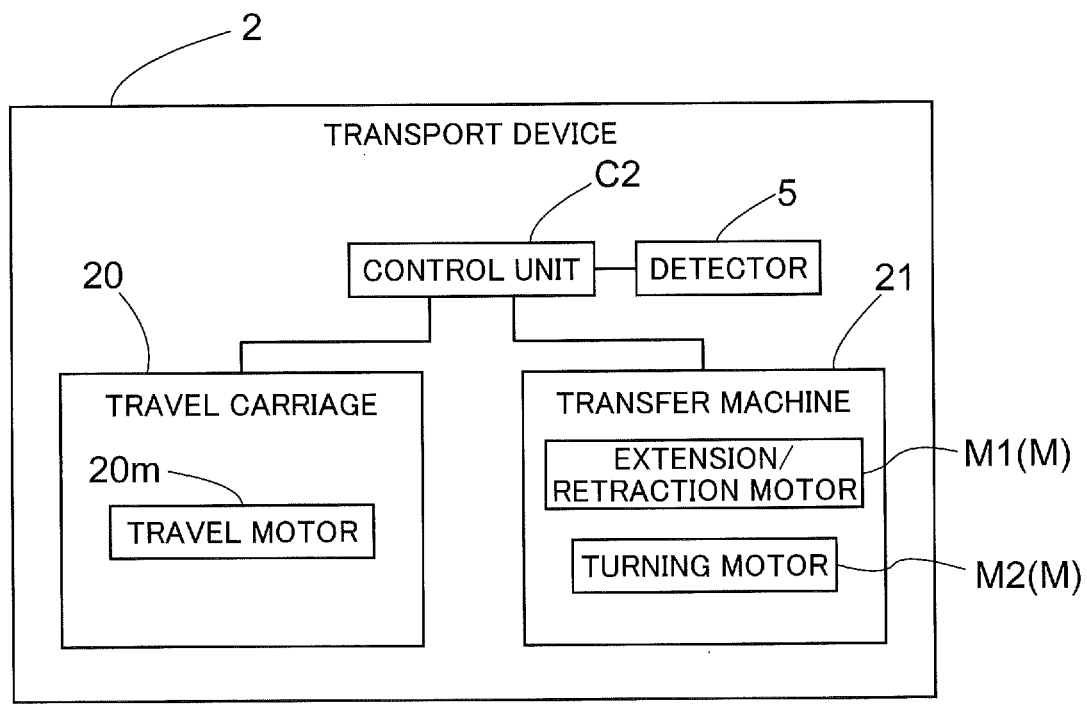
FIG. 6 is a control block diagram of the transport device.

In the present embodiment, the locking part 212 is driven to turn about an axis extending in the depth direction X by a turning motor M2 (see FIG. 6). In the present embodiment, the extension/retraction motor M1 for extending and retracting the transfer arm 211 and the turning motor M2 for turning the locking part 212 correspond to a "driver M". The driver M including the extension/retraction motor M1 and the turning motor M2 may include a mechanism and a device or the like (e.g., a motor) for realizing other operations of the transfer machine 21. For example, when the transfer machine 21 includes a motor (approaching/separation motor) for moving the two transfer arms 211 toward and away from each other in the width direction Y, the driver M may include this approaching/separation motor.

When executing the delivery operation of the transfer operation, the transfer machine 21 moves an article 90 (a target article 93) to the depth-direction far side X2 by moving the locking part 212 to the depth-direction far side X2 from the position corresponding to the holding region 2A toward the position corresponding to the first placement region A1 or the second placement region A2 with the locking part 212 locked to the front surface portion 901 of the article 90 (the target article 93). When executing the take-out operation of the transfer operation, the transfer machine 21 moves an article 90 (a first article 91 or a second article 92) to the depth-direction near side X1 by moving the locking part 212 to the depth-direction near side X1 from the position corresponding to the first placement region A1 or the second placement region A2 toward the position corresponding to the holding region 2A with the locking part 212 locked to the rear surface portion 902 of the article 90 (the first article 91 or the second article 92).

In the present embodiment, the locking part 212 includes locking members at a plurality of locations of the transfer arm 211 in the depth direction X. In other words, a plurality of locking members are disposed on each transfer arm 211 in a positional relationship in which the locking members are spaced apart from each other in the depth direction X. In the present example, the locking part 212 includes a first locking member 212a disposed at a position farthest in the depth direction X from a storage section 13 serving as a transfer target location, a second locking member 212b disposed at a position closest in the depth direction X to a storage section 13 serving as a transfer target location, and an intermediate locking member 212m disposed between the first locking member 212a and the second locking member 212b in the depth direction X. That is, when the depth-direction near side X1 and the depth-direction far side X2 are defined with reference to a storage section 13 serving as a transfer target location, the first locking member 212a is disposed at a portion of the transfer arm 211 on the depth-direction near side X1 (an end portion on the depth-direction near side X1 in the illustrated example), the second locking member 212b is disposed at a portion of the transfer arm 211 on the depth-direction far side X2 (an end portion on the depth-direction far side X2 in the illustrated example), and the intermediate locking member 212m is disposed between the locking parts 212a and 212b in the depth direction X. The first locking member 212a, the second locking member 212b, and the intermediate locking member 212m are provided for each of the two transfer arms 211. The pair of first locking members 212a are disposed at the same position in the depth direction X relative to the corresponding transfer arms 211 (here, the corresponding second arms 211b), and are configured to be locked to an article 90 in cooperation with each other. The pair of second locking members 212b and the pair of intermediate locking members 212m are also configured in the same manner.

Figure 9:
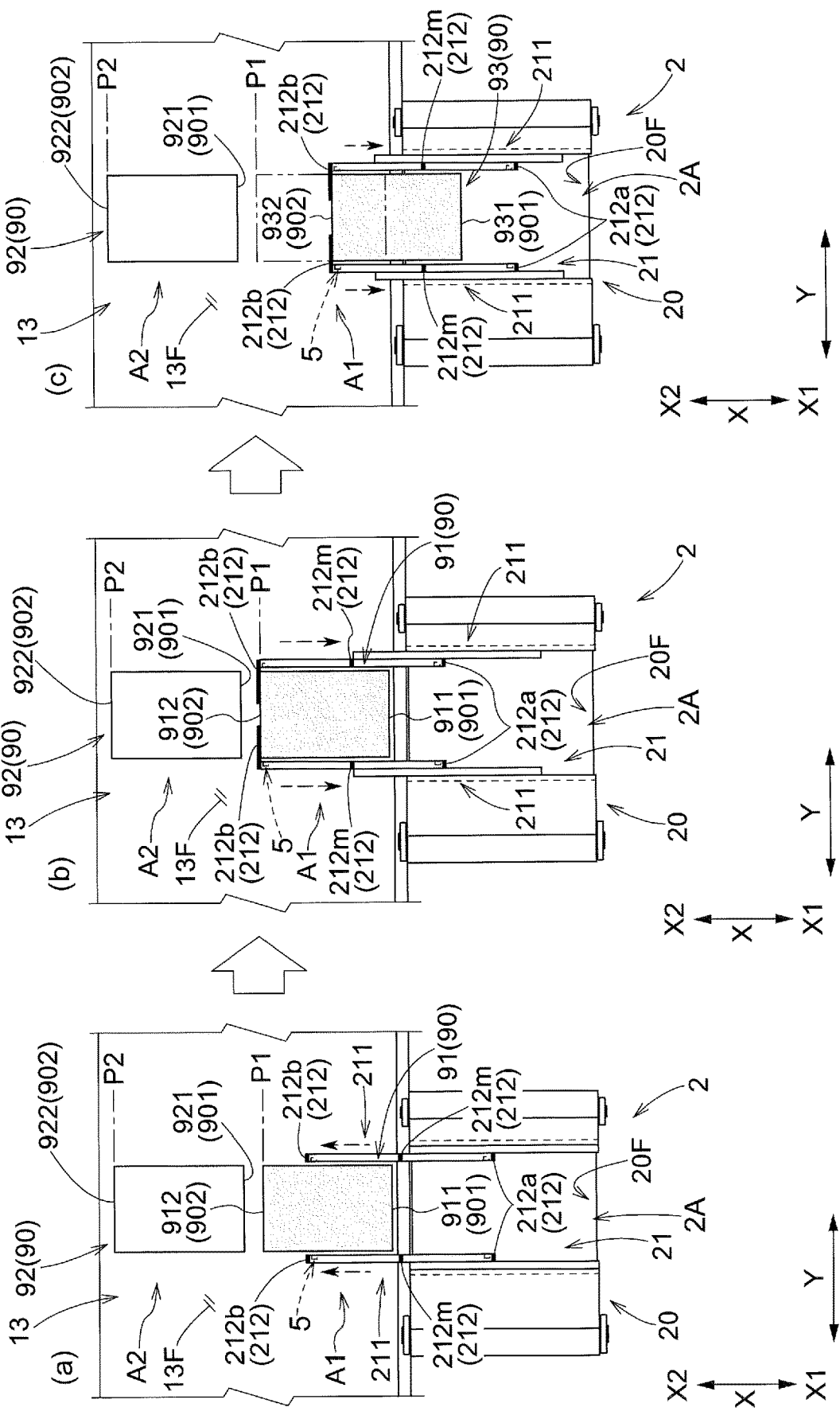
FIG. 9 is a diagram illustrating a first article take-out operation.
Figure 10:
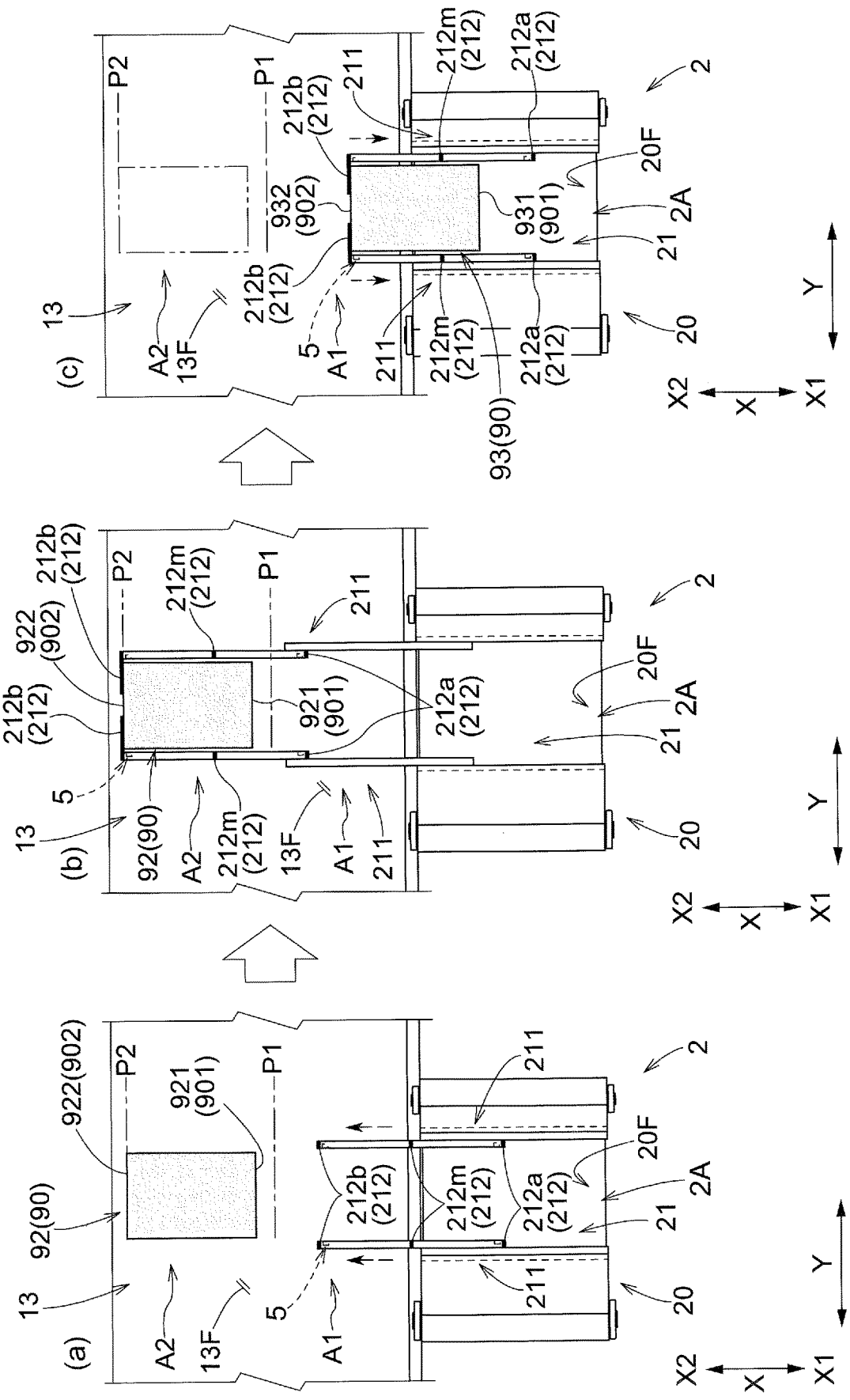
FIG. 10 is a diagram illustrating a second article take-out operation.

In the present embodiment, the first locking members 212a serve to deliver the first article 91 to the first placement region A1 of each storage section 13 (see FIG. 7). The intermediate locking members 212m serve to deliver the second article 92 to the second placement region A2 of each storage section 13 (see FIG. 8). The second locking members 212b serve to take out the first article 91 placed in the first placement region A1 of each storage section 13, and to take out the second article 92 placed in the second placement region A2 of each storage section 13 (FIGS. 9 and 10). In the present embodiment, as shown in FIG. 1, the storage sections 13 of each of the two article storage racks 1 may serve as transfer target locations. That is, depending on which of the two article storage racks 1 in which a storage section 13 specified as a transfer target location is provided, the relationship between the depth-direction near side X1 and the depth-direction far side X2 with respect to the transport device 2 may be reversed. In this case, the relationship between the first locking members 212a and the second locking members 212b may be also reversed. That is, depending on the storage section 13 serving as a transfer target location, the first locking members 212a may be the second locking members 212b. Also, the second locking members 212b may be the first locking members 212a.

In the present embodiment, each transfer machine 21 includes detectors 5 that detect the position of the article 90 in the depth direction X. Each detector 5 is configured to detect the position in the depth direction X of each of the first article 91 placed in the first placement region A1, and the second article 92 placed in the second placement region A2.

In the present example, the detector 5 detects whether or not the first article 91 placed in the first placement region A1 is disposed at the first article proper position P1, and detects whether or not the second article 92 placed at the second placement region A2 is disposed at the second article proper position P2.

In the present embodiment, each detector 5 is configured to move in the depth direction X in synchronization with the locking part 212. In the present example, the detector 5 is provided on the transfer arms 211, and is configured to move in the depth direction X accompanying the extension/retraction operation of the transfer arms 211. The detector 5 detects the position of an article 90 located between the two transfer arms 211 in the width direction Y. In the present embodiment, the detector 5 is provided in a distal end region in the protruding direction (an end region on the depth-direction far side X2) of the transfer arms 211. More specifically, the detector 5 is disposed at positions that are adjacent to the second locking members 212b, and that are located on the depth-direction far side X2 relative to the intermediate locking members 212m. In the illustrated example, the detector 5 is provided on the corresponding second arms 211b.

As the detector 5, it is possible to use, for example, a known sensor such as a photosensor or an ultrasonic sensor. In the present embodiment, each detector 5 is configured as a photosensor including a light projecting part 51 that projects detection light, and a light receiving part 52 that receives the detection light projected by the light projecting part 51.

When the detection light projected by the light projecting part 51 is received by the light receiving part 52, the detector 5 determines that "No article 90 is present". When the detection light projected by the light projecting part 51 is blocked by some object and is not received by the light receiving part 52, the detector 5 determines that "An article 90 is present".

The light projecting part 51 and the light receiving part 52 that constitute one detector 5 are disposed at the same position in the depth direction X. In the present example, each light projecting part 51 is provided on one of the two transfer arms 211, and each light receiving part 52 is provided on the other of the two transfer arms 211. The light projecting part 51 projects detection light in a direction parallel to the width direction Y, and the light receiving part 52 receives the detection light. Also, each detector 5 detects the position of the article 90 in the depth direction X, based on the amount of protrusion of the transfer arms 211 at the point of time at which the detection light projected by the light projecting part 51 was blocked. However, the present disclosure is not limited to the above-described configuration. When the detector 5 is formed by a photosensor, the detector 5 may include a light projecting/receiving part that projects/receives detection light, and a reflecting part that reflects the detection light.

Control Configuration of Article Storage Facility

Figure 5:
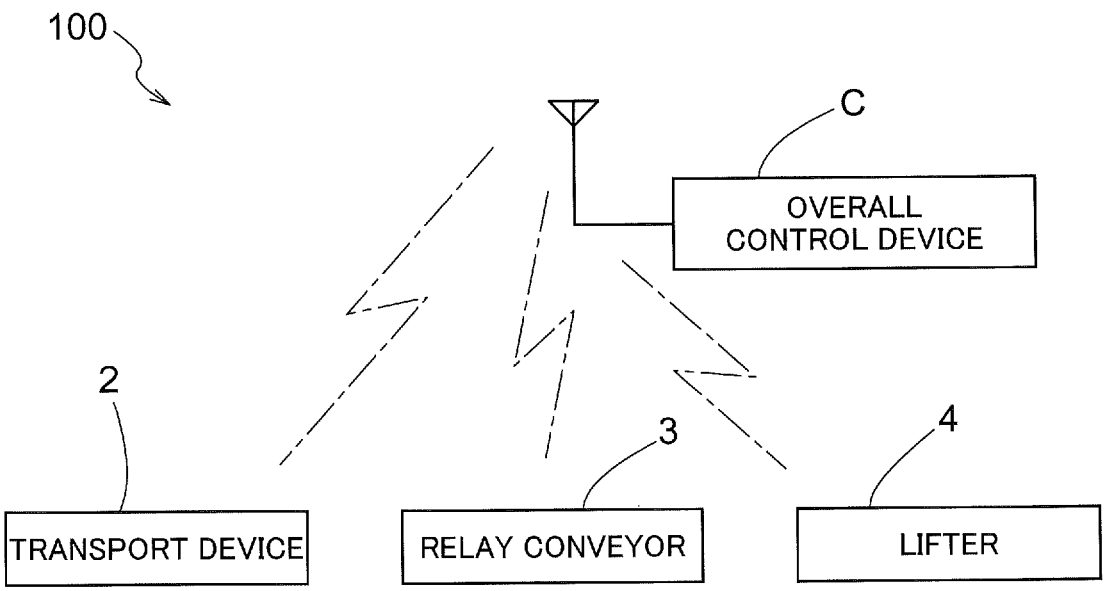
FIG. 5 is a control block diagram of the article storage facility.

As shown in FIG. 5, the article storage facility 100 includes an overall control device C that executes overall management of the entire facility. The overall control device C is configured to generate a transport instruction to transport an article 90 to any one of the plurality of storage sections 13 (see FIG. 1) included in the article storage rack 1, or transport an article 90 from any one of the plurality of storage sections 13, and transmit the transport instruction to each transport device 2. In the present embodiment, the overall control device C is configured to transmit the above-described transport instruction to each transport device 2, each relay conveyor 3, and each lifter 4. The transport device 2, the relay conveyor 3, and the lifter 4 that receive the transport instruction transport the article 90 to a desired location in cooperation with each other.

As shown in FIG. 6, each transport device 2 includes a control unit C2 that controls operation of the transport device 2. The control unit C2 is configured to control various functional units of the transport device 2. In the present embodiment, the control unit C2 is configured to control a travel motor 20m for driving the travel carriage 20 to travel, an extension/retraction motor M1 for driving the transfer arms 211 (see FIG. 3, etc.) of the transfer machine 21 to extend and retract, and a turning motor M2 for driving the locking parts 212 supported by the transfer arms 211 to turn. In the present embodiment, the control unit C2 included in each transport device 2 corresponds to a "control unit". As described above, in the present embodiment, the extension/retraction motor M1 and the turning motor M2 correspond to the "driver M".

In the present embodiment, the control unit C2 receives a result of detection performed by each detector 5, and controls the operation of the transfer machine 21 based on the detection result. In the present example, based on the position of the second article 92 in the depth direction X detected by the detector 5, the control unit C2 determines whether or not to cause the transfer machine 21 to execute a second article position adjustment operation described below. When the second article 92 is not disposed at the second article proper position P2, the control unit C2 causes the transfer machine 21 to execute the second article position adjustment operation (see FIG. 12).

The control unit C2 and the overall control device C described above each include, for example, a processor such as a microcomputer and a peripheral circuit such as a memory. Various functions are implemented by these pieces of hardware working in cooperation with a program executed on a processor such as a computer.

Transfer Operation

Next, the transfer operation of an article 90 executed by each transfer machine 21 will be described with reference to FIGS. 7 to 12. Since FIGS. 7 to 12 are explanatory diagrams schematically illustrating the transfer operation, detailed configurations (e.g., the width direction restricting members 14y, the depth direction restricting member 14x, etc.) have been omitted.

The transfer operation executed by the transfer machine 21 includes a delivery operation of delivering an article 90 (a target article 93) to each storage section 13, and a take-out operation of taking out an article 90 (a first article 91 or a second article 92) from each storage section 13. As shown in FIG. 6, the transfer operation executed by the transfer machine 21 is achieved by the control unit C2 controlling the driver M (the extension/retraction motor M1 and the turning motor M2). The following description will be given with reference to FIG. 6 as well.

In the present embodiment, the delivery operation includes a first article delivery operation of delivering the target article 93 to the first placement region A1 of each storage section 13 as the first article 91, and a second article delivery operation of delivering the target article 93 to the second placement region A2 of each storage section 13 as the second article 92.

The take-out operation includes a first article take-out operation of taking out the first article 91 placed in the first placement region A1 of each storage section 13, and a second article take-out operation of taking out the second article 92 placed in the second placement region A2 of each storage section 13.

FIG. 7 shows the transfer machine 21 executing the first article delivery operation. The control unit C2 controls the driver M to cause the transfer machine 21 to execute the first article delivery operation. As shown in FIG. 7, in the first article delivery operation, the control unit C2 causes the first locking members 212a (locking parts 212) to be disposed on the depth-direction near side X1 relative to the front surface portion 931 of the target article 93 located in the holding region 2A, and subsequently causes the first locking members 212*a* to move to the depth-direction far side X2 with the first locking members 212*a* locked to the front surface portion 931 of the target article 93, to store the target article 93 in the first placement region A1 as the first article 91 (see (a) and (b) in FIG. 7). Specifically, the control unit C2 controls the turning motor M2 to cause the first locking members 212*a* to protrude in the width direction Y, and controls the extension/retraction motor M1 to cause the transfer arms 211 to protrude toward the depth-direction far side X2, thereby pushing the target article 93 toward the depth-direction far side X2 using the first locking members 212*a* (see (a) and (b) in FIG. 7). Thus, in the present embodiment, the first article delivery operation is executed using the first locking members 212*a* disposed further toward the depth-direction near side X1 than the second locking members 212*b*. That is, the first article delivery operation is executed using near-side locking members (the first locking members 212*a* in the present example) that are disposed further toward the depth-direction near side X1 than far-side locking members (the second locking members 212*b* in the present example) of the plurality of locking members that are disposed furthermost toward the depth-direction far side X2. Accordingly, it is possible to reduce the amount of protrusion of the transfer arms 211 in the first article delivery operation, thus reducing the cycle time when executing the first article delivery operation. In the first article delivery operation, the target article 93 that has been pushed by the first locking members 212*a* slides on the support surface 20F of the travel carriage 20 and the placement surface 13F of the storage section 13 so as to be placed in the first placement region A1 and disposed at the first article proper position P1. In other words, in the first article delivery operation, the target article 93 is transferred from the holding region 2A to the first placement region A1 as the first article 91.

The amount of protrusion of the transfer arms 211 toward the depth-direction far side X2 in the first article delivery operation is controlled based on the length in the depth direction X of the target article 93 and the first article proper position P1. After the target article 93 has been disposed at the first article proper position P1 as the first article 91, the control unit C2 controls the extension/retraction motor M1 to cause the transfer arms 211 to retract toward the depth-direction near side X1 (see (c) in FIG. 7). That is, the control unit C2 causes the target article 93 to be stored in the first placement region A1 as the first article 91, and subsequently causes the first locking members 212*a* to move to the depth-direction near side X1 so as to be restored to the position corresponding to the holding region 2A. In the present example, concurrently with or after the retraction of the transfer arms 211 toward the depth-direction near side X1, the control unit C2 controls the turning motor M2 to bring the first locking members 212*a* into the non-protruding state.

Figure 8:
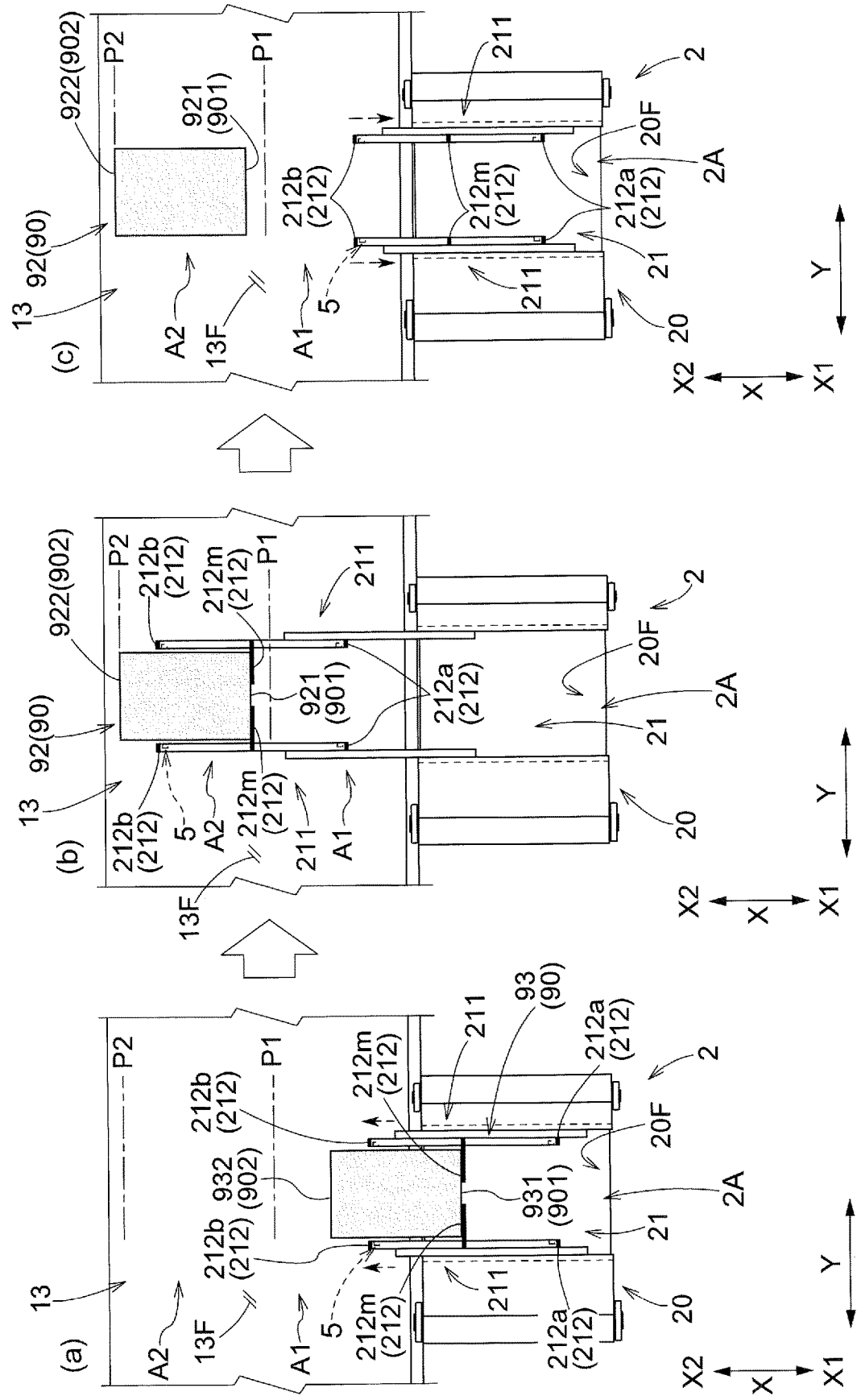
FIG. 8 is a diagram illustrating a second article delivery operation.

FIG. 8 shows the transfer machine 21 executing the second article delivery operation. The control unit C2 controls the driver M to cause the transfer machine 21 to execute the second article delivery operation. As shown in FIG. 8, in the second article delivery operation, the control unit C2 causes the intermediate locking members 212*m* (the locking parts 212) to be disposed on the depth-direction near side X1 relative to the front surface portion 931 of the target article 93 located in the holding region 2A, and subsequently causes the intermediate locking members 212*m* to move to the depth-direction far side X2 with the intermediate locking members 212*m* locked to the front surface portion 931 of the target article 93, to store the target article 93 in the second placement region A2 as the second article 92 (see (a) and (b) in FIG. 8). Specifically, the control unit C2 controls the turning motor M2 to cause the intermediate locking members 212*m* to protrude in the width direction Y, and controls the extension/retraction motor M1 to cause the transfer arms 211 to protrude toward the depth-direction far side X2, thereby pushing the target article 93 toward the depth-direction far side X2 using the intermediate locking members 212*m* (see (a) and (b) in FIG. 8). Thus, in the present embodiment, the second article delivery operation is executed using the intermediate locking members 212*m* disposed further toward the depth-direction near side X1 than the second locking members 212*b*. In the present embodiment, in a reference state, which is a state of the transfer arms 211 while the travel carriage 20 is traveling, the intermediate locking members 212*m* are located further toward the depth-direction far side X2 than the front surface portion 931 of the target article 93 is.

Therefore, in the second article delivery operation, an operation is executed in which, after the target article 93 has been moved toward the depth-direction far side X2 in the holding region 2A using the first locking members 212*a*, the intermediate locking members 212*m* are locked to the front surface portion 931 of the target article 93, and subsequently the transfer arms 211 are caused to protrude toward the depth-direction far side X2. In addition, in the second article delivery operation, an operation may be executed in which the transfer arms 211 are temporarily moved to the depth-direction near side X1 to lock the intermediate locking members 212*m* to the front surface portion 931 of the target article 93, and subsequently the transfer arms 211 are caused to protrude toward the depth-direction far side X2. In this manner, the control unit C2 causes the transfer machine 21 to execute the second article delivery operation. In the second article delivery operation, the target article 93 pushed by the intermediate locking members 212*m* slides on the support surface 20F of the travel carriage 20 and the placement surface 13F of the storage section 13 so as to be placed in the second placement region A2 and disposed at the second article proper position P2. In other words, in the second article delivery operation, the target article 93 is transferred from the holding region 2A to the second placement region A2 as the second article 92.

The amount of protrusion of the transfer arms 211 toward the depth-direction far side X2 in the second article delivery operation is controlled based on the length in the depth direction X of the target article 93 and the second article proper position P2. After the target article 93 has been disposed at the second article proper position P2, the control unit C2 controls the extension/retraction motor M1 to cause the transfer arms 211 to retract toward the depth-direction near side X1 (see (c) in FIG. 8). That is, the control unit C2 causes the target article 93 to be stored in the second placement region A2 as the second article 92, and subsequently causes the intermediate locking members 212*m* to move to the depth-direction near side X1 so as to be restored to the position corresponding to the holding region 2A. In the present example, concurrently with or after the retraction of the transfer arms 211 toward the depth-direction near side X1, the control unit C2 controls the turning motor M2 to bring the intermediate locking members 212*m* into the non-protruding state.

FIG. 9 shows the transfer machine 21 executing the first article take-out operation. The control unit C2 controls the driver M to cause the transfer machine 21 to execute the first article take-out operation. As shown in FIG. 9, in the first article take-out operation, the control unit C2 controls the driver M to dispose the second locking members 212b (locking parts 212) between the first article 91 and the second article 92 in the depth direction X, and subsequently to move the second locking members 212b to the depth-direction near side X1 with the second locking members 212b locked to the rear surface portion 912 of the first article 91. Specifically, the control unit C2 controls the extension/retraction motor M1 to cause the transfer arms 211 to protrude toward the depth-direction far side X2, and subsequently controls the turning motor M2 to cause the second locking members 212b to protrude in the width direction Y with the second locking members 212b located between the first article 91 and the second article 92 in the depth direction X, thereby disposing the second locking members 212b between the first article 91 and the second article 92 in the depth direction X (see (a) and (b) in FIG. 9). Subsequently, the control unit C2 controls the extension/retraction motor M1 to cause the transfer arms 211 to retract toward the depth-direction near side X1, thereby causing the second locking members 212b to be locked to the rear surface portion 912 of the first article 91 and to be moved toward the depth-direction near side X1. Thus, the control unit C2 sets the first article 91 as the target article 93 by using the second locking members 212b to pull the first article 91 toward the depth-direction near side X1, and causes the target article 93 to move to the holding region 2A on the support surface 20F (see (c) in FIG. 9). In this manner, the control unit C2 causes the transfer machine 21 to execute the first article take-out operation. In the first article take-out operation, the first article 91 (the target article 93) that is pulled using the second locking members 212b slides on the placement surface 13F of the storage section 13 and the support surface 20F of the travel carriage 20 so as to be placed on the support surface 20F of the travel carriage 20. In other words, in the first article take-out operation, the first article 91 is transferred from the first placement region A1 toward the depth-direction near side X1 as the target article 93, and is transferred to the holding region 2A.

The amount of protrusion of the transfer arms 211 toward the depth-direction far side X2 when the second locking members 212b are disposed between the first article 91 and the second article 92 in the depth direction X in the first article take-out operation is controlled based on the first article proper position P1. More specifically, the above-described amount of protrusion is controlled with reference to a position further toward the depth-direction far side X2 by a predetermined distance than the position of the rear surface portion 912 of the first article 91 that is assumed to be located at the first article proper position P1, taking into account displacement in the depth direction X of the first article 91 stored in the storage section 13, a control error (e.g., an error in the amount of protrusion of the transfer arms 211) of the control unit C2, a mechanical error (e.g., an installation error between the article storage rack 1 and the transport device 2) of the article storage facility 100, and the like. However, the present disclosure is not limited to such a configuration, and the control unit C2 may control the amount of protrusion of the transfer arms 211 based on a result of detection performed by the detector 5, for example. The detector 5 detects the presence or absence of the first article 91 at various positions in the depth direction X while the transfer arms 211 are caused to protrude toward the depth-direction far side X2. In this case, the control unit C2 may control the amount of protrusion of the transfer arms 211 based on a position at which the result of detection performed by the detector 5 indicates a change from "Article present" to "Article absent". The second locking members 212b can be disposed at an appropriate position by causing the second locking members 212b to protrude in the width direction Y at a position located further toward the depth-direction far side X2 by a certain distance than the position at which the result indicates a change from "Article present" to "Article absent".

FIG. 10 shows the transfer machine 21 executing the second article take-out operation. The control unit C2 controls the driver M to cause the transfer machine 21 to execute the second article take-out operation. As shown in FIG. 10, in the second article take-out operation, the control unit C2 controls the driver M to dispose the second locking members 212b (the locking parts 212) further toward the depth-direction far side X2 than the second article 92, and subsequently to move the second locking members 212b to the depth-direction near side X1 with the second locking members 212b locked to the rear surface portion 922 of the second article 92. Specifically, the control unit C2 controls the extension/retraction motor M1 to cause the transfer arms 211 to protrude toward the depth-direction far side X2, and subsequently controls the turning motor M2 to cause the second locking members 212b to protrude in the width direction Y with the second locking members 212b located further toward the depth-direction far side X2 than the rear surface portion 922 of the second article 92, thereby disposing the second locking members 212b further toward the depth-direction far side X2 than the second article 92 (see (a) and (b) in FIG. 10). Subsequently, the control unit C2 controls the extension/retraction motor M1 to cause the transfer arms 211 to retract toward the depth-direction near side X1, thereby causing the second locking members 212b to be locked to the rear surface portion 922 of the second article 92 and to be moved to the depth-direction near side X1. Thus, the control unit C2 sets the second article 92 as the target article 93 by using the second locking member 212b to pull the second article 92 toward the depth-direction near side X1, and causes the target article 93 to move to the holding region 2A on the support surface 20F (see (c) in FIG. 10). In this manner, the control unit C2 causes the transfer machine 21 to execute the second article take-out operation. In the second article take-out operation, the second article 92 (the target article 93) that is pulled using the second locking members 212b slides on the placement surface 13F of the storage section 13 and the support surface 20F of the travel carriage 20 so as to be placed on the support surface 20F of the travel carriage 20. In other words, in the second article take-out operation, the second article 92 is transferred from the second placement region A2 toward the depth-direction near side X1 as the target article 93, and is transferred to the holding region 2A.

The amount of protrusion of the transfer arms 211 toward the depth-direction far side X2 when the second locking members 212b are disposed further toward the depth-direction far side X2 than the second article 92 in the second article take-out operation is controlled based on the second article proper position P2. More specifically, the above-described amount of protrusion is controlled with reference to a position further toward the depth-direction far side X2 by a predetermined distance than the position of the rear surface portion 922 of the second article 92 that is assumed to be located at the second article proper position P2, taking into account displacement in the depth direction X of the second article 92 stored in the storage section 13, a control error (e.g., an error in the amount of protrusion of the transfer arms 211) of the control unit C2, a mechanical error (e.g., an installation error between the article storage rack 1 and the transport device 2) of the article storage facility 100, and the like. As described above, in the present embodiment, the depth direction restricting member 14x that restricts the movement of the second article 92 toward the depth-direction far side X2 is provided in the storage section 13 (see FIG. 2). Accordingly, for example, even if the second article 92 vibrates in the storage section 13, the second article 92 is unlikely to move further toward the depth-direction far side X2 past the above-described depth direction restricting member 14x. Therefore, it is preferable that the amount of protrusion of the transfer arms 211 toward the depth-direction far side X2 when the second locking members 212b are disposed further toward the depth-direction far side X2 than the second article 92 is controlled based on the position at which the depth direction restricting member 14x is disposed. Accordingly, it is possible to prevent the second locking members 212b from interfering with the side surface portions 923 of the second article 92, thus making it possible to dispose the second locking members 212b at an appropriate position. However, the present disclosure is not limited to the above-described configuration, and the control unit C2 may control the amount of protrusion of the transfer arms 211 based on a result of detection performed by the detector 5 as described above.

Here, in the article storage facility 100, the article storage racks 1 may vibrate due to the operation or the like of the transport devices 2, resulting in displacement of the articles 90 stored in the storage sections 13. In order to correct such displacement, the transfer machines 21 can be used to adjust the positions of the articles 90. As will be described below, the article storage facility 100 according to the present disclosure enables efficient adjustment of the position of an article 90 (a second article 92) that is disposed on the depth-direction far side X2 (the second placement region A2) in a configuration including at least one storage section 13 capable of storing two articles 90 arranged in the depth direction X.

Each transfer machine 21 is configured to execute a position detection operation of detecting the position of an article 90 stored in each storage section 13, and a position adjustment operation of adjusting the position of an article 90 stored in each storage section 13, in addition to the delivery operation of delivering an article 90 to each storage section 13 and the take-out operation of taking out an article 90 from each storage section 13. The position detection operation includes a second article position detection operation of detecting the position of the second article 92 stored in the second placement region A2 of the storage section 13. The position adjustment operation includes a second article position adjustment operation of positioning the second article 92 stored in the second placement region A2 of the storage section 13 at the second article proper position P2.

FIG. 11 shows the transfer machine 21 executing the second article position detection operation. The control unit C2 is configured to control the driver M to cause the transfer machine 21 to execute the second article position detection operation. That is, as shown in FIG. 11, in the second article position detection operation, during execution of the first article delivery operation of delivering the target article 93 to the first placement region A1, the control unit C2 causes the detector 5 to move toward the depth-direction far side X2 by causing the first locking members 212a (the locking parts 212) to move toward the depth-direction far side X2, and causes the detector 5 to detect the position in the depth direction X of the second article 92 stored in the second placement region A2. In the present embodiment, in the second article position detection operation, the control unit C2 causes the transfer arms 211 to protrude toward the depth-direction far side X2, thereby causing the detector 5, more specifically, the range of detection by the detector 5, to move toward the depth-direction far side X2 so as to be moved to a position corresponding to the second placement region A2. In the present example, in the second article position detection operation, the control unit C2 causes the detector 5 (the range of detection by the detector 5) to move toward the depth-direction far side X2 from a predetermined first position located further toward the depth-direction near side X1 than an end portion on the depth-direction near side X1 of the second placement region A2 until the detector 5 detects the front surface portion 921 of the second article 92. Thus, the position of the front surface portion 921 of the second article 92 stored in the second placement region A2 is detected. Note that when the detector 5 has moved to a predetermined second position set in the second placement region A2 (e.g., a position corresponding to a central portion in the depth direction X of the second placement region A2) without detecting the front surface portion 921 of the second article 92, the second article position detection operation ends. In this case, the control unit C2 determines that the second article 92 is not housed in the second placement region A2. The position in the depth direction X of the front surface portion 921 of the second article 92 disposed at the second article proper position P2 is determined based on the second article proper position P2 and the length in the depth direction X of the second article 92.

That is, the greater the length in the depth direction X of the second article 92, the further the front surface portion 921 of the second article 92 disposed in the second article proper position P2 is to be disposed toward the depth-direction near side X1. Conversely, the smaller the length in the depth direction X of the second article 92, the further the front surface portion 921 of the second article 92 disposed at the second article proper position P2 is to be disposed toward the depth-direction far side X2. In the present embodiment, the control unit C2 determines whether or not the second article 92 is disposed at the second article proper position P2, based on the second article proper position P2, the length in the depth direction X of the second article 92, and a result of detection performed by the detector 5.

In the present embodiment, as shown in FIG. 11, the position of attachment of the detector 5 to the transfer arms 211 is set such that, in the process of disposing the target article 93 at the first article proper position P1 in the first placement region A1 as the first article 91, the detector 5 (the range of detection by the detector 5) passes through a region in which the front surface portion 921 of the second article 92 may possibly be disposed in the depth direction X, from the depth-direction near side X1 toward the depth-direction far side X2. However, the present disclosure is not limited to such a configuration, and the detector 5 (the range of detection by the detector 5) may be located further toward the depth-direction near side X1 than the region in which the front surface portion 921 of the second article 92 may possibly be disposed, with the target article 93 disposed at the first article proper position P1 as the first article 91. In this case, the control unit C2 may cause the transfers arms 211 to protrude toward the depth-direction far side X2 after locking of the first locking members 212a to the front surface portion 911 of the first article 91 has been released, thereby moving the detector 5 (the range of detection by the detector 5) to the region in which the front surface portion 921 of the second article 92 may possibly be disposed in the depth direction X. In this case, the control unit C2 controls the amount of protrusion of the transfer arms 211 such that the detector 5 (the range of detection by the detector 5)

passes through the region in which the front surface portion 921 of the second article 92 may possibly be disposed in the depth direction X, from the depth-direction near side X1 toward the depth-direction far side X2.

Figure 12:
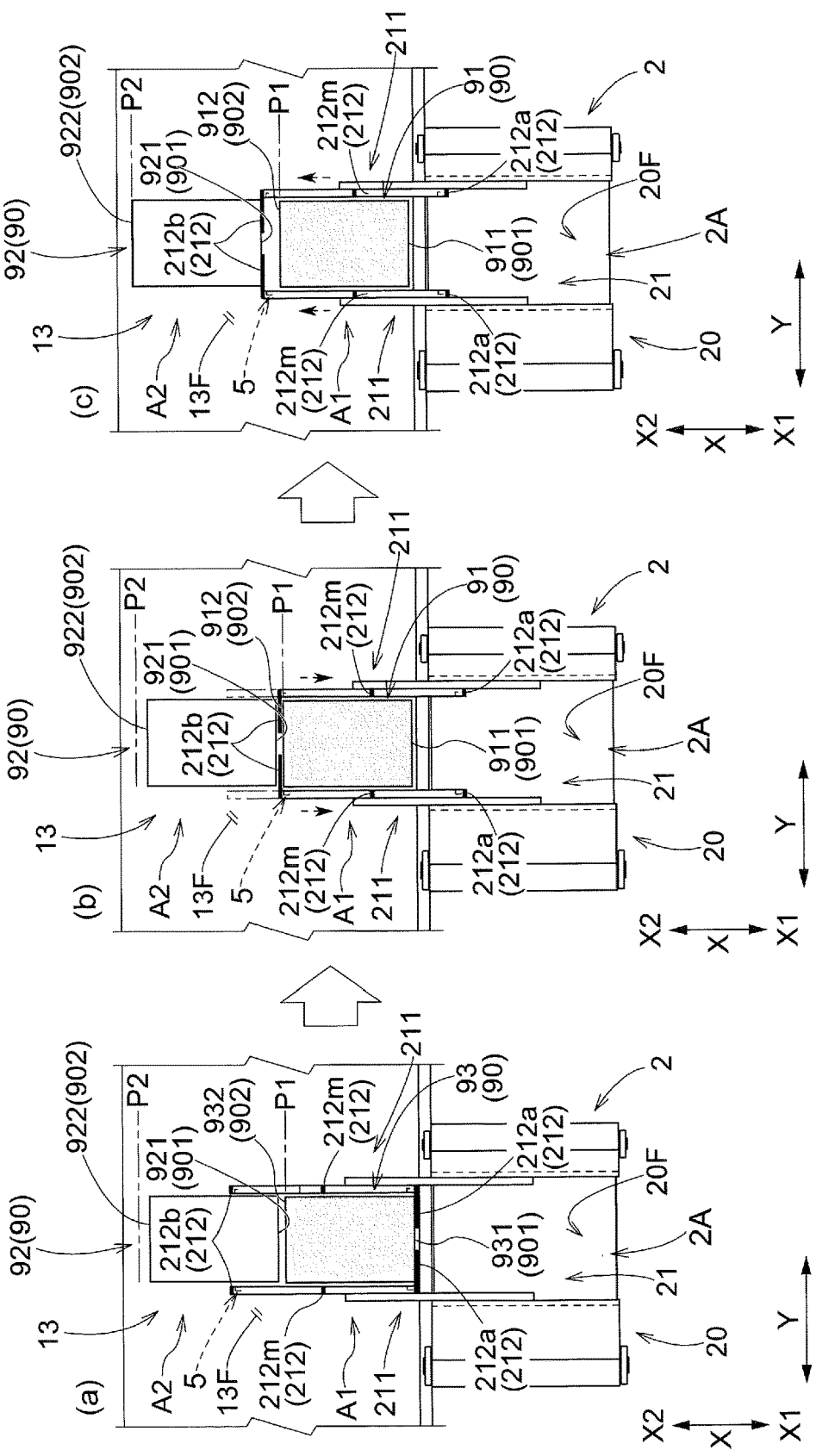
FIG. 12 is a diagram illustrating a second article position adjustment operation.

FIG. 12 shows the transfer machine 21 executing the second article position adjustment operation. The control unit C2 is configured to control the driver M to cause the transfer machine 21 to execute the second article position adjustment operation. That is, as shown in (b) and (c) in FIG. 12, in the second article position adjustment operation, the control unit C2 controls the driver M to cause the transfer machine 21 to dispose the second locking members 212b (the locking parts 212) between the first article 91 and the second article 92 in the depth direction X, and to move the second locking members 212b toward the depth-direction far side X2 to a position corresponding to the position of the front surface portion 921 of the second article 92 located at the second article proper position P2. Thus, in the present embodiment, the second article position adjustment operation is executed using the far-side locking members (the second locking members 212b in the present example) of the plurality of locking members that are disposed furthermost toward the depth-direction far side X2. Accordingly, it is possible to reduce the amount of protrusion of the transfer arms 211 in the second article position adjustment operation, thus reducing the cycle time when executing the second article position adjustment operation.

That is, as shown in (b) and (c) in FIG. 12, in the second article position adjustment operation, the control unit C2 controls the driver M to cause the transfer machine 21 to execute an operation in which the second locking members 212b (the locking parts 212) disposed between the first article 91 and the second article 92 in the depth direction X are moved toward the depth-direction far side X2 to a position corresponding to the position of the front surface portion 921 of the second article 92 located at the second article proper position P2. In the example shown in (a) and (b) in FIG. 12, the second article 92 has shifted from the second article proper position P2 toward the depth-direction near side X1. In such a case, the control unit C2 controls the extension/retraction motor M1 to cause the transfer arms 211 to protrude toward the depth-direction far side X2 with the second locking members 212b disposed between the first article 91 and the second article 92 in the depth direction X, thereby locking the second locking members 212b to the front surface portion 921 of the second article 92. Subsequently, the control unit C2 controls the extension/retraction motor M1 to cause the transfer arms 211 to protrude further toward the depth-direction far side X2 to move the second locking members 212b toward the depth-direction far side X2, to push the second article 92 toward the depth-direction far side X2 so as to be disposed at the second article proper position P2 (see (c) in FIG. 12). In this manner, the control unit C2 causes the transfer machine 21 to execute the second article position adjustment operation.

The amount of protrusion of the transfer arms 211 toward the depth-direction far side X2 when the second article 92 is positioned at the second article proper position P2 in the second article position adjustment operation is controlled based on the length in the depth direction X of the second article 92 and the second article proper position P2. For example, as illustrated, when the second article proper position P2 is defined with reference to the position of the rear surface portion 922 (the position indicated by "P2" in the drawing) of the second article 92 that is assumed to be located at the second article proper position P2 (the second article 92 need not actually be disposed at the second article proper position P2), the position of the rear surface portion 922 is constant regardless of the length in the depth direction X of the second article 92. In this case, the amount of protrusion of the transfer arms 211 is controlled such that the second locking members 212b are disposed at a position spaced toward the depth-direction near side X1 from the position of the rear surface portion 922 of the second article 92 that is assumed to be located at the second article proper position P2 by a distance corresponding to the length in the depth direction X of the second article 92. Accordingly, for example, in the case where the length in the depth direction X of the second article 92 is not uniform, and the second article proper position P2 is defined with reference to the position of the rear surface portion 922 of the second article 92, the control unit C2 controls the amount of protrusion of the transfer arms 211 in the second article position adjustment operation such that the greater the length in the depth direction X of a target second article 92, the smaller the amount of protrusion of the transfer arms 211, and the smaller the length in the depth direction X of a target second article 92, the greater the amount of protrusion of the transfer arms 211.

Here, the second article position adjustment operation is executed during execution of the first article delivery operation. More specifically, the control unit C2 uses the first locking members 212a to store the target article 93 in the first placement region A1 as the first article 91 (see (a) in FIG. 12) during execution of the first article delivery operation using the transfer machine 21, and subsequently causes the transfer machine 21 to execute the second article position adjustment operation, and, upon end of the second article position adjustment operation (see (b) and (c) in FIG. 12), causes the first locking members 212a (the locking parts 212) used for storing the target article 93 in the first placement region A1 to be restored to the position corresponding to the holding region 2A, to end the first article delivery operation (see (c) in FIG. 7).

Furthermore, in the present embodiment, as shown in FIG. 12, the second article position adjustment operation is executed after storing the target article 93 in the first placement region A1 as the first article 91 during execution of the first article delivery operation, subsequently releasing the locking of the first locking members 212a (the near-side locking members) to the front surface portion 911 of the first article 91, and disposing the second locking members 212b (the far-side locking members) between the first article 91 and the second article 92 in the depth direction X. Thus, when executing the second article position adjustment operation using the second locking members 212b (the far-side locking members), it is possible to prevent the first locking members 212a (the near-side locking members) from impeding the second article position adjustment operation. Accordingly, the amount of protrusion of the transfer arms 211 in the first article delivery operation and the second article position adjustment operation can be kept small, and the cycle time of each operation executed using the transfer arms 211 can be reduced. In addition, the second article position adjustment operation can be executed while the first article 91 is stored at a proper position by the first article delivery operation.

In the present embodiment, the second article position adjustment operation is executed when it is detected, as a result of executing the second article position detection operation (see FIG. 11), that the second article 92 is not disposed at the second article proper position P2. As described above, in the present embodiment, each detector 5 is provided in a distal end region in the protruding direction (an end region in the depth-direction far side X2) of the transfer arms 211, and is disposed at a position adjacent to the second locking member 212b. Furthermore, in the present embodiment, the separation distance in the depth direction X between the first locking members 212a and the corresponding second locking member 212b is set to be greater than the length in the depth direction X of the first placement region A1. Accordingly, upon end of the first article delivery operation after the second article position detection operation has been executed along with the first article delivery operation using the first locking members 212a, it is considered that the second locking members 212b disposed in distal end regions in the depth-direction far side X2 of the corresponding transfer arms 211 are disposed further toward the depth-direction far side X2 than the front surface portion 921 of the second article 92 is (see (a) in FIG. 12). Accordingly, in the present embodiment, when it is detected, as a result of executing the first article delivery operation and the second article position detection operation, that the second article 92 is not disposed at the second article proper position P2, the transfer arms 211 are caused to temporarily retract toward the depth-direction near side X1 so as to dispose the second locking members 212b further toward the depth-direction near side X1 than the front surface portion 921 of the second article 92 is ((b) in FIG. 12), and subsequently the second article position adjustment operation is executed. More specifically, after the first article delivery operation and the second article position detection operation have been executed, the transfer arms 211 are caused to retract toward the depth-direction near side X1 so as to dispose the second locking members 212b between the first article 91 and the second article 92 in the depth direction X, and subsequently the second locking members 212b are moved toward the depth-direction far side X2 to a position corresponding to the position of the front surface portion 921 of the second article 92 located at the second article proper position P2, thereby executing the second article position adjustment operation.

As described thus far, the second article position detection operation and the second article position adjustment operation are executed during execution of the first article delivery operation. Accordingly, it is possible to efficiently detect displacement of the second article 92, and adjust the position of the second article 92 if the second article 92 is displaced.

On the other hand, in the present embodiment, when it is detected, as a result of executing the second article position detection operation, that the second article 92 is disposed at the second article proper position P2, the control unit C2 does not cause the transfer machine 21 to execute the second article position adjustment operation. In this case, the control unit C2 causes the target article 93 to be stored in the first placement region A1 as the first article 91 using the first locking members 212a, and subsequently causes the first locking members 212a (the locking parts 212) to be restored to the position corresponding to the holding region 2A without executing the second article position adjustment operation, to end the first article delivery operation (see (c) in FIG. 7). Accordingly, the control unit C2 can end the first article delivery operation without causing the transfer machine 21 to execute the operation for adjusting the position of the second article 92, and it is therefore possible to reduce the cycle time of the first article delivery operation.

Since it is unlikely that the second article 92 is precisely disposed at the second article proper position P2, the range in which the disposition of the second article 92 at the second article proper position P2 is detected when determining whether or not to execute the second article position adjustment operation is preferably set as a positional range having a certain length in the depth direction X. For example, it is preferable to adopt a configuration in which it is detected that the second article 92 is disposed at the second article proper position P2 when the second article 92 is disposed in a range extending from the position of the second article 92 located at the second article proper position P2 to a position away therefrom by a predetermined distance in both the depth-direction near side X1 and the depth-direction far side X2, and it is detected that the second article 92 is not disposed at the second article proper position P2 when the second article 92 is disposed outside this range.

OTHER EMBODIMENTS

Next, other embodiments of the article storage facility will be described.

(1) The above embodiment has described an example in which the first article delivery operation is executed using the first locking members 212a disposed further toward the depth-direction near side X1 than the far-side locking members (the second locking members 212b). However, the present disclosure is not limited to such an example, and the first article delivery operation may be executed using the intermediate locking members 212m disposed further toward the depth-direction near side X1 than the far-side locking members (the second locking members 212b). That is, in this case, the intermediate locking members 212m are used as the "near-side locking members".

(2) The above embodiment has described an example in which the second article position adjustment operation is executed using the second locking members 212b (the far-side locking members) that are disposed furthermost toward the depth-direction far side X2 among the plurality of locking members. However, the present disclosure is not limited to such an example, and the second article position adjustment operation may be executed using the locking parts 212 disposed further toward the depth-direction near side X1 than the second locking members 212b (the far-side locking members). For example, the second article position adjustment operation may be executed using the intermediate locking members 212m disposed at an intermediate portion in the depth direction X of the transfer arms 211. In this case, if the intermediate locking members 212m are disposed further toward the depth-direction near side X1 than the front surface portion 921 of the second article 92 is at a time point at which displacement of the second article 92 has been detected by the detector 5, it is possible to cause the transfer machine 21 to execute the second article position adjustment operation without causing the transfer arms 211 to retract toward the depth-direction near side X1. If the intermediate locking members 212m are disposed further toward the depth-direction far side X2 than the front surface portion 921 of the second article 92 is at a time point at which displacement of the second article 92 has been detected by the detector 5, the intermediate locking members 212m may be disposed further toward the depth-direction near side X1 than the front surface portion 921 of the second article 92 is by temporarily causing the transfer arms 211 to retract toward the depth-direction near side X1, as in the above-described embodiment.

(3) The above embodiment has described an example in which the control unit C2 causes the transfer machine 21 to execute the second article position adjustment operation when it is detected, as a result of executing the second article position detection operation, that the second article 92 is not disposed at the second article proper position P2. However, the present disclosure is not limited to such an example, and the control unit C2 may cause the transfer machine 21 to execute the second article position adjustment operation during execution of the first article delivery operation, each time the control unit C2 causes the transfer machine 21 to execute the first article delivery operation. In other words, the control unit C2 may cause the transfer machine 21 to execute the second article position adjustment operation during execution of the first article delivery operation, regardless of whether or not the second article 92 is displaced. In this case, even if the second article position adjustment operation is executed, the second article 92 will not be moved toward the depth-direction far side X2 by the second locking members 212b when the second article 92 is located at the second article proper position P2. However, as a result of the control unit C2 causing the transfer machine 21 to execute the second article position adjustment operation each time the control unit C2 causes the transfer machine 21 to execute the first article delivery operation, the position adjustment of each of a plurality of second articles 92 stored in the article storage rack 1 can be performed at certain intervals. Accordingly, it is possible to reduce the likelihood of the position of the second article 92 being significantly shifted from the second article proper position P2. The above-described configuration can eliminate the need for the detector 5 for detecting the position of the second article 92.

(4) The control unit C2 may cause the transfer machine 21 to execute the second article position adjustment operation during execution of the first article delivery operation regardless of the result of detection performed by the detector 5, if a preset condition is satisfied.

The longer the second article 92 is stored in a storage section 13, the more likely it is that the second article 92 will have shifted from the second article proper position P2 due to vibrations or the like of the article storage rack 1. For this reason, the above-described preset condition may include, for example, a condition that the length of time that the second article 92 has been stored in the storage section 13 is greater than or equal to a predetermined threshold. In this case, for a second article 92 for which the length of time it has been stored in the storage section 13 exceeds the threshold, the control unit C2 causes the transfer machine 21 to execute the second article position adjustment operation during execution of the first article delivery operation. This makes it possible to cause the transfer machine 21 to execute the second article position adjustment operation during execution of the first article delivery operation, on a second article 92 that is highly likely to have become displaced.

(5) The above embodiment has described an example in which each storage section 13 includes width direction restricting members 14y protruding upward from the placement surface 13F on opposite sides in the width direction Y relative to each of the first placement region A1 and the second placement region A2. However, the width direction restricting members 14y are not essential components of the article storage facility 100, and do not necessarily need to be provided in the storage section 13.

(6) The above embodiment has described an example in which each storage section includes a depth direction restricting member 14x protruding upward from the placement surface 13F on the depth-direction far side X2 relative to the second placement region A2. However, the depth direction restricting member 14x is not an essential component of the article storage facility 100, and does not necessarily need to be provided in the storage section 13.

(7) The above embodiment has described an example in which each of the locking parts 212 is configured to turn relative to the corresponding transfer arm 211 about an axis extending in the depth direction X, thereby changing between a protruding state of protruding toward the other transfer arm 211 in the width direction Y, and a non-protruding state of not protruding toward the other transfer arm 211. However, the present disclosure is not limited to such an example, and each of the locking parts 212 may be supported so as to be turnable relative to the corresponding transfer arm 211 about an axis extending in the vertical direction Z, and may be configured to change between the protruding state and the non-protruding state by turning about an axis extending in the vertical direction Z. Alternatively, each of the locking parts 212 may be supported so as to move in the width direction Y relative to the corresponding transfer arm 211, and may be configured to change between the protruding state and the non-protruding state.

(8) The above embodiment has described an example in which the locking parts 212 supported by one transfer arm 211 of the two transfer arms 211 are configured to change between the protruding state of protruding toward the other transfer arm 211 in the width direction Y, and the non-protruding state of not protruding toward the other transfer arm 211. However, the present disclosure is not limited to such an example, and the locking parts 212 may be fixed to and supported by the corresponding transfer arms 211 so as to be constantly in the protruding state. In this case, the two transfer arms 211 that support the respective locking parts 212 may be configured to move toward and away from each other in the width direction Y. The two locking parts 212 may be disposed at positions where they overlap the article 90 as viewed in the depth direction X by moving the two transfer arms 211 toward each other in the width direction Y, and the two locking parts 212 may be disposed at positions where they do not overlap the article 90 as viewed in the depth direction X by moving the two transfer arms 211 away from each other in the width direction Y. Such a configuration can also realize a configuration that enables the locking parts 212 to be locked to the front surface portion 901 or the rear surface portion 902 of the article 90.

(9) The above embodiment has described an example in which three locking parts 212 are provided for each of the two transfer arms 211. However, the present disclosure is not limited to such an example, and two or fewer locking parts 212 or four or more locking parts 212 may be provided for each of the two transfer arms 211. In addition, the above embodiment has described an example in which the intermediate locking members 212m are disposed at a central position of the space between the first locking members 212a and the second locking members 212b in the depth direction X. However, the present disclosure is not limited thereto, and the intermediate locking members 212m may be disposed on a side closer to the first locking members 212a, or a side closer to the second locking members 212b, than the central position of the space between the first locking members 212a and the second locking members 212b. In such a case, the space between the first locking members 212a and the intermediate locking members 212m in the depth direction X, or the space between the intermediate locking members 212m and the second locking members 212b in the depth direction X may be set according to the length in the depth direction X of the article 90, or may be set to be greater than the length in the depth direction X of the article 90.

Figure 13:
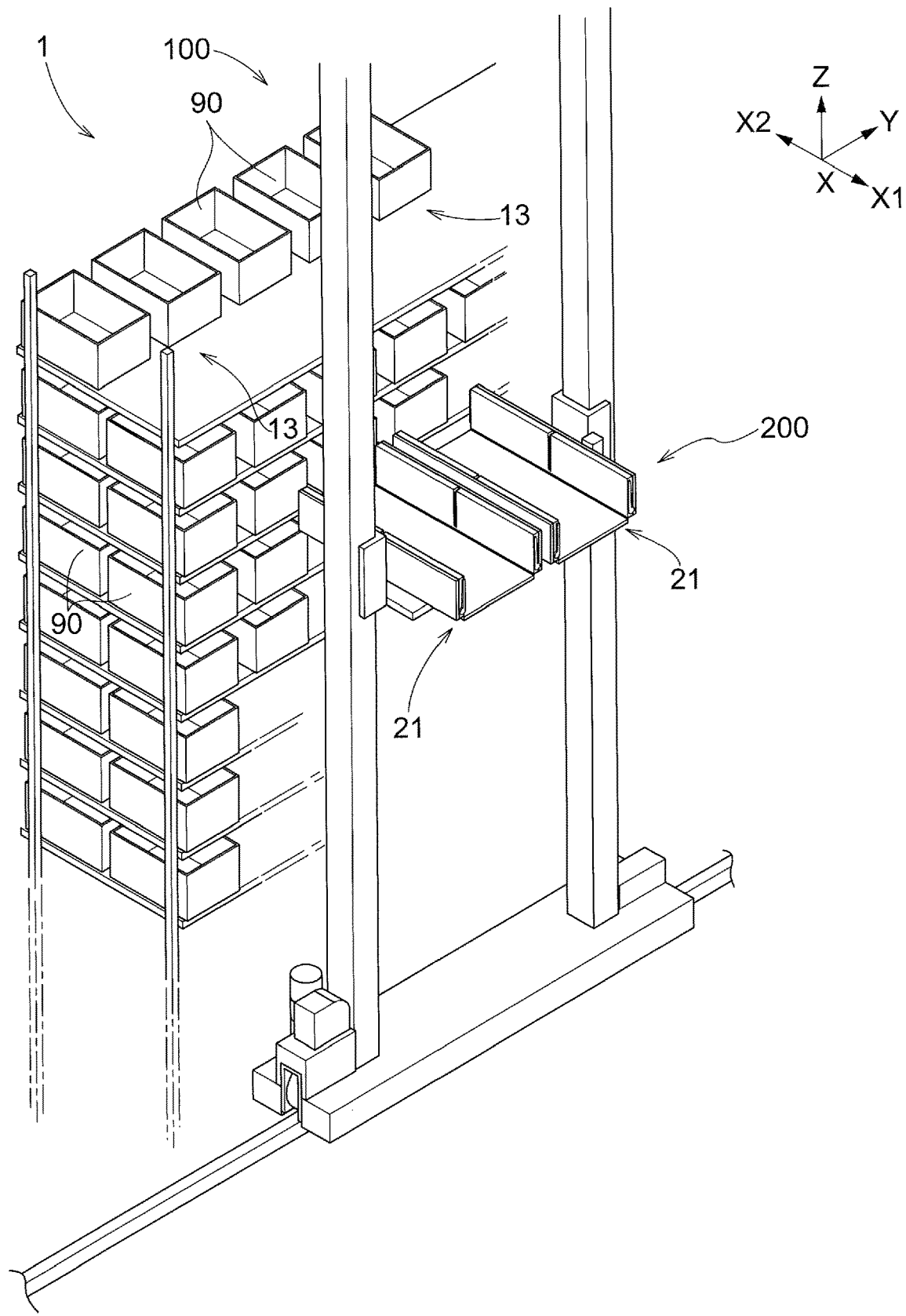
FIG. 13 is a schematic perspective view showing an article storage facility according to another embodiment.

(10) In addition to the configuration described in the above first embodiment, a stacker crane 200 configured to move the transfer machine 21 in the vertical direction Z and the width direction Y as shown in FIG. 13, for example, may be used as the transport device 2. Although FIG. 13 shows a configuration in which one stacker crane 200 includes a plurality of transfer machines 21 (two transfer machines 21), it is possible to adopt a configuration in which one stacker crane 200 includes one transfer machine 21.

(11) Note that the configurations disclosed in the embodiments described above are applicable in combination with configurations disclosed in other embodiments as long as no inconsistency arises. With regard to the other configurations as well, the embodiments disclosed herein are illustrative in all respects. Therefore, various modifications and alterations may be made as appropriate without departing from the gist of the present disclosure.

Outline of the Embodiment

The article storage facility described above will be described below.

The article storage facility includes:
an article storage rack including a storage section capable of storing two articles arranged in a depth direction;
a transport device configured to transport the articles in a transport direction intersecting the depth direction; and
a control unit configured to control operation of the transport device,
wherein the transport device includes a transfer machine configured to execute a delivery operation of moving the articles in the depth direction to deliver the articles to the article storage rack,
when a side on which the transport device is located relative to the article storage rack in the depth direction is defined as a depth-direction near side, a side opposite to the depth-direction near side is defined as a depth-direction far side, the article stored in a first placement region on the depth-direction near side of the storage section is defined as a first article, the article stored in a second placement region on the depth-direction far side of the storage section is defined as a second article, the article that is being transported by the transport device is defined as a target article, a proper position of the second article in the storage section is defined as a second article proper position, and a region in the transport device in which region the target article is held is defined as a holding region,
the transfer machine includes a locking part configured to be locked to a front surface portion of each of the articles which front surface portion faces the depth-direction near side, and a driver configured to move the locking part between a position corresponding to the holding region and a position corresponding to the first placement region or the second placement region,
the locking part includes a first locking member and a second locking member,
the control unit is capable of controlling the driver to cause the transfer machine to execute:
a first article delivery operation of disposing the first locking member on the depth-direction near side relative to the front surface portion of the target article located in the holding region, and subsequently moving the first locking member to the depth-direction far side with the first locking member locked to the front surface portion of the target article, to store the target article in the first placement region as the first article, and subsequently moving the first locking member to the depth-direction near side so as to be restored to the position corresponding to the holding region, to execute the delivery operation; and,
a second article position adjustment operation of moving the second locking member disposed between the first article and the second article in the depth direction toward the depth-direction far side to a position corresponding to a position of the front surface portion of the second article located at the second article proper position, and
the control unit is configured to, after the target article has been stored in the first placement region as the first article during execution of the first article delivery operation using the transfer machine, cause the transfer machine to execute the second article position adjustment operation, and, upon end of the second article position adjustment operation, cause the first locking member to be restored to the position corresponding to the holding region to end the first article delivery operation.

With the present configuration, the transfer machine executes the second article position adjustment operation to move the second locking member toward the depth-direction far side to a position corresponding to a position of the front surface portion of the second article located at the second article proper position. Thus, even if the second article has shifted from the second article proper position toward the depth-direction near side before the second article position adjustment operation is executed, the second article can be moved to the depth-direction far side to be positioned at the second article proper position using the second locking member. Also, with the present configuration, such a second article position adjustment operation is executed after the target article has been stored in the first placement region as the first article during execution of the first article delivery operation. That is, using the operation of moving the first locking member to the depth-direction far side in order to store the target article in the first placement region as the first article, it is possible to dispose the second locking member between the first article and the second article in the depth direction, and execute the second article position adjustment operation. Therefore, with the present configuration, it is possible to efficiently adjust the position of the second article stored on the depth-direction far side of the storage section.

Here, it is preferable that the transfer machine includes a detector configured to detect a position of each of the articles in the depth direction, the detector is configured to move in the depth direction in synchronization with the locking part, the control unit is capable of, during the execution of the first article delivery operation. causing the transfer machine to execute a second article position detection operation of moving the detector toward the depth-direction far side while moving the first locking member toward the depth-direction far side and causing the detector to detect a position in the depth direction of the second article stored in the second placement region, and the second article position adjustment operation is executed when it is detected, as a result of executing the second article position detection operation, that the second article is not disposed at the second article proper position.

With the present configuration, displacement of the second article in the depth direction can be detected by the second article position detection operation executed as the first locking member is caused to move toward the depth-direction far side during execution of the first article delivery operation. Also, when displacement of the second article is detected, the second article position adjustment operation can be performed to dispose the displaced second article at the second article proper position. On the other hand, when it is detected, as a result of the second article position detection operation, that there is no displacement of the second article in the depth direction, control can be performed so as not to execute the second article position adjustment operation. In this manner, with the present configuration, the second article position detection operation and the second article position adjustment operation can be executed during execution of the first article delivery operation, and the second article position adjustment operation can be performed only when the second article position adjustment operation is necessary. Accordingly, it is possible to more efficiently adjust the position of the second article.

It is preferable that the transfer machine includes a transfer arm configured to extend and retract in the depth direction, the locking part includes locking members at a plurality of locations in the depth direction of the transfer arm, when a far-side locking member of the plurality of locking members that is disposed furthermost toward the depth-direction far side is defined as the second locking member, the second article position adjustment operation is executed using the far-side locking member, and, when a near-side locking member of the plurality of locking members that is disposed further toward the depth-direction near side than the far-side locking member is defined as the first locking member, the first article delivery operation is executed using the near-side locking member.

With the present configuration, the first article delivery operation is executed using the near-side locking member, and the second article position adjustment operation is executed using the far-side locking member. Accordingly, it is possible to reduce the amount of protrusion of the transfer arm in the second article position adjustment operation, and the amount of protrusion of the transfer arm in the first article delivery operation, thus reducing the cycle time of each operation executed using the transfer arm.

In the configuration in which the locking part includes locking members at a plurality of locations in the depth direction of the transfer arm, it is preferable that the second article position adjustment operation is executed after storing the target article in the first placement region as the first article during execution of the first article delivery operation, subsequently releasing locking of the near-side locking member to the front surface portion of the first article, and disposing the far-side locking member between the first article and the second article in the depth direction.

With the present configuration, when the second article position adjustment operation using the far-side locking member is executed during execution of the first article delivery operation using the near-side locking member, it is possible to prevent the near-side locking member from impeding the second article position adjustment operation. Accordingly, with the present configuration, the amount of protrusion of the transfer arm in the first article delivery operation and the second article position adjustment operation can be kept small, and the cycle time of each operation executed using the transfer arm can be reduced. In addition, the second article position adjustment operation can be executed while the first article is stored at an appropriate position by the first article delivery operation.

It is preferable that, when a surface of the storage section on which the articles are placed is defined as a placement surface, and a direction orthogonal to the depth direction in a plan view is defined as a width direction, the storage section includes width direction restricting members protruding upward from the placement surface on opposite sides in the width direction relative to each of the first placement region and the second placement region.

With the present configuration, the position in the width direction of each of the first article and the second article can be restricted by the width direction restricting members. Accordingly, it is possible to facilitate appropriate execution of the operations of the transfer machine such as the second article position detection operation and the second article position adjustment operation.

It is preferable that the storage section includes a depth direction restricting member protruding upward from the placement surface on the depth-direction far side relative to the second placement region.

With the present configuration, it is possible to restrict movement of the second article further toward the depth-direction far side past the depth direction restricting member. In addition, if the second article is displaced toward the depth-direction near side, the second article can be positioned at the second article proper position through the above-described second article position adjustment operation. Therefore, with the present configuration, the second article can be positioned within a proper range in the depth direction.

INDUSTRIAL APPLICABILITY

The technique according to the present disclosure is applicable to an article storage facility including an article storage rack including a storage section capable of storing articles, and a transport device that transports the articles.

DESCRIPTION OF REFERENCE SIGNS

100: Article storage facility
1: Article storage rack
13: Storage section
13F: Placement surface
14x: Depth direction restricting member
14y: Width direction restricting member
2: Transport device
2A: Holding region
21: Transfer machine
211: Transfer arm
212: Locking part
5: Detector
90: Article
91: First article
92: Second article
93: Target article
901: Front surface portion
911: Front surface portion
921: Front surface portion
931: Front surface portion
A1: First placement region
A2: Second placement region
C2: Control unit
M: Driver
P2: Second article proper position
X: Depth direction
X1: Depth-direction near side
X2: Depth-direction far side
Y: Width direction

The invention claimed is:

1. An article storage facility comprising:
an article storage rack comprising a storage section capable of storing two articles arranged in a depth direction;

a transport device configured to transport the articles in a transport direction intersecting the depth direction; and a control unit configured to control operation of the transport device, wherein:

the transport device comprises a transfer machine configured to execute a delivery operation of moving the articles in the depth direction to deliver the articles to the article storage rack, when a side on which the transport device is located relative to the article storage rack in the depth direction is defined as a depth-direction near side, a side opposite to the depth-direction near side is defined as a depth-direction far side, the article stored in a first placement region on the depth-direction near side of the storage section is defined as a first article, the article stored in a second placement region on the depth-direction far side of the storage section is defined as a second article, the article that is being transported by the transport device is defined as a target article, a proper position of the second article in the storage section is defined as a second article proper position, and a region in the transport device in which region the target article is held is defined as a holding region, the transfer machine comprises:
  a locking part configured to be locked to a front surface portion of each of the articles which front surface portion faces the depth-direction near side; and
  a driver configured to move the locking part between a position corresponding to the holding region and a position corresponding to the first placement region or the second placement region, the locking part comprises:
  a first locking member; and
  a second locking member, the control unit is configured to control the driver to cause the transfer machine to execute:

a first article delivery operation of disposing the first locking member on the depth-direction near side relative to the front surface portion of the target article located in the holding region, and subsequently moving the first locking member to the depth-direction far side with the first locking member locked to the front surface portion of the target article to store the target article in the first placement region as the first article, and subsequently moving the first locking member to the depth-direction near side so as to be restored to the position corresponding to the holding region to execute the delivery operation; and, a second article position adjustment operation of moving the second locking member disposed between the first article and the second article in the depth direction toward the depth-direction far side to a position corresponding to a position of the front surface portion of the second article located at the second article proper position, and wherein the control unit is configured to, after the target article has been stored in the first placement region as the first article during execution of the first article delivery operation using the transfer machine, cause the transfer machine to execute the second article position adjustment operation and upon end of the second article position adjustment operation, cause the first locking member to be restored to the position corresponding to the holding region to end the first article delivery operation.

2. The article storage facility according to claim 1, wherein:

the transfer machine comprises a detector configured to detect a position of each of the articles in the depth direction, the detector is configured to move in the depth direction in synchronization with the locking part, the control unit is configured to, during the execution of the first article delivery operation, cause the transfer machine to execute a second article position detection operation of moving the detector toward the depth-direction far side while moving the first locking member toward the depth-direction far side and causing the detector to detect a position, in the depth direction, of the second article stored in the second placement region, and the second article position adjustment operation is executed when it is detected, as a result of executing the second article position detection operation, that the second article is not disposed at the second article proper position.

3. The article storage facility according to claim 1, wherein:

the transfer machine includes a transfer arm configured to extend and retract in the depth direction, the locking part comprises locking members at a plurality of locations in the depth direction of the transfer arm, when a far-side locking member of the plurality of locking members that is disposed furthermost toward the depth-direction far side is defined as the second locking member, the second article position adjustment operation is executed using the far-side locking member, and, when a near-side locking member of the plurality of locking members that is disposed further toward the depth-direction near side than the far-side locking member is defined as the first locking member, the first article delivery operation is executed using the near-side locking member.

4. The article storage facility according to claim 3, wherein the second article position adjustment operation is executed after storing the target article in the first placement region as the first article during execution of the first article delivery operation, subsequently releasing locking of the near-side locking member to the front surface portion of the first article, and disposing the far-side locking member between the first article and the second article in the depth direction.

5. The article storage facility according to claim 1, wherein, when a surface of the storage section on which the articles are placed is defined as a placement surface, and a direction orthogonal to the depth direction in a plan view is defined as a width direction, and wherein the storage section comprises width direction restricting members protruding upward from the placement surface on opposite sides in the width direction relative to each of the first placement region and the second placement region.

6. The article storage facility according to claim 5, wherein the storage section comprises a depth direction restricting member protruding upward from the placement surface on the depth-direction far side relative to the second placement region.

* * * * *

UNITED STATES PATENT AND TRADEMARK OFFICE
CERTIFICATE OF CORRECTION

| | | |
|---|---|---|
| PATENT NO. | : 12,172,834 B2 | Page 1 of 1 |
| APPLICATION NO. | : 17/912241 | |
| DATED | : December 24, 2024 | |
| INVENTOR(S) | : Yuichi Ueda et al. | |

It is certified that error appears in the above-identified patent and that said Letters Patent is hereby corrected as shown below:

On the Title Page

Column 2, Item (57) Abstract, Line 14, delete "be" and insert -- to be --

In the Claims

Column 32, Line 27, Claim 3, delete "includes" and insert -- comprises --

Signed and Sealed this
Twenty-fifth Day of February, 2025

Coke Morgan Stewart
*Acting Director of the United States Patent and Trademark Office*